United States Patent Office 3,314,897
Patented Apr. 18, 1967

3,314,897
WATER-SOLUBLE NITROGEN PREPOLYMER COMPOSITIONS
Van R. Gaertner, Ballwin, Mo., assignor to Monsanto Company, a corporation of Delaware
No Drawing. Filed Jan. 16, 1963, Ser. No. 251,743
14 Claims. (Cl. 260—2)

This invention relates to organic nitrogen prepolymer compositions derived from at least two components, to methods for preparing them, to polysaccharide materials treated with said compositions, and to methods for improving the physical and chemical characteristics of polysaccharides by treating the same with said compositions.

These compositions are especially valuable for sizing paper and improving the wet and dry tensile strengths and dimensional stability of paper, and for water-proofing cellulosic textiles and improving their crease-resistance. They are also valuable as starch modifying agents.

Briefly, this invention provides:

A. Prepolymer compositions having at least two components, one of which is a simple prepolymer of (1) an aliphatic amine-epihalohydrin adduct and (2) an amine, the other components being either amines, adducts, or other prepolymers;
B. A process for preparing several component prepolymer compsitions, by reacting a simple prepolymer with at least one amine, adduct, or other prepolymer;
C. Polysaccharide materials treated with a minor amount of a prepolymer composition of the type described under (A) above;
D. Methods for sizing and increasing the wet and dry strengths and dimensional stability of paper products by applying to the paper product a minor amount of a prepolymer composition of the type described under (A) above; and
E. New copolymeric amines derived from the reaction an aliphatic amine or polymeric amine with an epihalohydrin in the presence of an alkaline material, which copolymeric amines are especially useful in the preparation of prepolymer compositions of the type described under (A) above.

One aspect of this invention provides water soluble and water dispersible organic nitrogen prepolymer compositions derived from at least two components, one of which components (a) is a simple prepolymer, and the other components are selected from the group consisting of (b) aliphatic amines and aliphatic polymeric amines, (c) adducts of an epihalohydrin and a member of the group consisting of aliphatic amines, aliphatic polymeric amines, and mixtures thereof, and (d) prepolymers, all of said components being further defined as follows:

(a) is a simple prepolymer obtained from
(1) an adduct of an epihalohydrin and a member of the group consisting of an aliphatic amine, an aliphatic polymeric amine, and mixtures thereof, having at least one primary nitrogen and at least two amino hydrogens, said adduct having at least two haloalkanol equivalents, said aliphatic amine, and an aliphatic polymeric amine having a formula selected from the group consisting of (I) 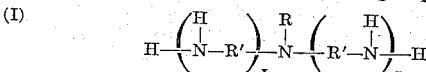

(II) 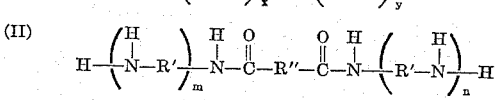

(III) $H_2N-R'-Y-R'-NH_2$ (IV) 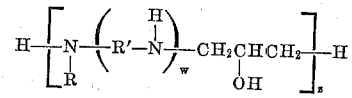

wherein R is selected from the group consisting of hydrogen, alkyl groups having from 1 to about 24 carbon atoms, alkenyl groups having from 3 to about 24 carbon atoms with the double bond thereof at least two carbon atoms removed from a nitrogen-carbon bond, and acyl radicals of the type R'''C(O)— wherein R''' is an alkyl group having from 1 to about 24 carbon atoms, R' is a bivalent alkylene group having from 2 to 6 carbon atoms, R" is a bivalent group selected from the class consisting of alkylene and alkenylene groups having from 2 to 40 carbon atoms, each of $x$ and $y$ is an average number of from 0 to 6, $x$ plus $y$ equals 0 to 10, each of $m$ and $n$ is an average number of at least 1 and $m$ plus $n$ equals from 2 to 6, Y is a bivalent oxygen ether group selected from the class consisting of —O—, —O—R'—O—, and —O(R'—O)$_u$R'—O— wherein R' is as defined above and $u$ is an average number of from 1 to about 100, $w$ is an average number of from 0 to 4, and $z$ is an average number of from 2 to 20, and mixtures of said types of amines, said adduct molecule having at least two haloalkanol equivalents; and
(2) an amine selected from the group consisting of an aliphatic amine, an aliphatic polymeric amine, and mixtures thereof described above under (a)(1);
(b) is selected from the group consisting of aliphatic amines, aliphatic polymeric amines of the types described above under (a)(1), and mixtures thereof;
(c) is an adduct of the type described under (a)(1); and
(d) is a prepolymer of the type described above under (a).

At least one of said components of said prepolymer composition having at least three moieties per molecule selected from the group consisting of haloalkanol equivalent derived from the epihalohydrin used, and amino hydrogen, the proportions of said components of said prepolymer composition being such that the resulting prepolymer is crosslinkable when cured; that is, it has sufficient number of available amino hydrogen and haloalkanol equivalents present to cause gel formation upon curing of the prepolymer composition. The ratios of the various components of the prepolymer composition in terms of moles of the respective components may vary extensively as long as the complementary amino hydrogen and haloalkanol equivalents are present in functional or reactive group ratios ranging from about 1:5 to 5:1 of amino hydrogen to haloalkanol equivalent and the composition is crosslinkable when cured.

The term "water soluble" prepolymer composition in this specification includes not only the water soluble prepolymer compositions but also prepolymer compositions which are uniformly dispersible in water for application to polysaccharide materials.

The prepolymer compositions of this invention have the characteristic of being "crosslinkable when cured." This means that when the prepolymer composition in water solution having a concentration of 5% or more by weight of prepolymer composition solids is treated with alkali sufficient to raise the pH of mixture to pH 11 to 13, the prepolymer composition will crosslink, as evidenced by gel formation. These gels are insoluble in water or any solvent which does not degrade the crosslinked polymer structure.

Another aspect of this invention provides a process for preparing water soluble organic nitrogen prepolymer compositions from at least two components by contacting and reacting (a) a simple prepolymer of (1) an adduct of an epihalohydrin and an aliphatic amine of one or more of the types I, II, III, and IV, defined above, said adduct having at least two haloalkanol groups per molecule, and (2) at least one aliphatic amine having at least two amino hydrogens of the types I, II, III, or IV, with at least one additional component which is selected from the group consisting of (b) aliphatic amines and polymeric amines of types I, II, III, and IV described above, (c) adducts of an epihalohydrin and an aliphatic amine of the types described above, said adducts having at least two haloalkanol equivalents, and (d) prepolymers of (1) adducts of an epihalohydrin and an aliphatic amine of any one or more of types I, II, III, or IV, defined above, and (2) an aliphatic amine having at least two amino hydrogens of types I, II, III, and IV defined above, at least one of said components having at least three moieties selected from the group consisting of haloalkanol equivalent derived from the epihalohydrin used and amino hydrogen, the components being combined in such proportion as to provide the resulting prepolymer composition with sufficient amino hydrogen and haloalkanol functions or groups that the prepolymer composition will crosslink when cured.

Another aspect of this invention provides polysaccharide materials treated with a minor amount of an organic nitrogen prepolymer composition of the type described above, as new compositions of matter.

Another aspect of this invention provides methods for improving the wet and dry strength and dimensional stability of polysaccharide materials by treating said polysaccharide materials by impregnation, mixing, spraying, coating, or by other conventional methods with the organic nitrogen prepolymer compositions of this invention.

Another aspect of this invention provides a method for conveniently and efficiently sizing paper products by incorporating into the aqueous pulp which is to be used to make said paper a minor amount of the organic nitrogen prepolymer compositions of this invention containing components bearing hydrophobic groups, and then forming the resulting treated pulp into paper according to conventional techniques.

Another aspect of this invention provides a new class of copolymeric aliphatic amines of the formula

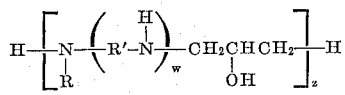

wherein R is selected from the group consisting of alkyl groups having from 10 to about 24 carbon atoms, alkenyl groups having from 10 to about 24 carbon atoms with the double bond thereof at least two carbon atoms removed from a nitrogen carbon bond, and acyl radicals of the type $R'''C(O)-$ wherein $R'''$ is an alkyl group having from 10 to about 24 carbon atoms, $R'$ is a bivalent alkylene group having from 2 to 6 carbon atoms, $w$ is an average number of from 0 to 4, and $z$ is an average number of from 2 to 20.

Another aspect of this invention provides simple prepolymers of (1) adducts of epihalohydrin and copolymeric amines of the type described above, said adducts having at least 0.5 mole of epihalohydrin residue (haloalkanol equivalent) per equivalent of copolymeric amine, and (2) an aliphatic amine of the types described above.

PREPOLYMER COMPOSITIONS

The prepolymer compositions of this invention are complex lower polymeric reaction products of the components. The prepolymer compositions are best described as precursors, or intermediates for highly crosslinked polymeric gels and have an average total of at least three reactive groups or functional moieties per molecule of the prepolymer composition. These reactive groups are the reactive functional moieties which are either "haloalkanol equivalents" or amino hydrogens. The term "haloalkanol equivalent" refers to a group or moiety of the prepolymer structure derived from the epihalohydrin added to the amine or polymeric amine, used in preparing either the simple prepolymer component (a) or the adduct (1), or the prepolymer components of (d), described above. Thus, for example, when epichlorohydrin is the epihalohydrin used and it is reacted with the amine to form the adduct, the "haloalkanol" group formed by the resulting addition reaction is $-CH_2CH(OH)CH_2Cl$. The halogen of these "haloalkanol" groups is an essential part of the prepolymer composition, being present in the composition both as a part of the haloalkanol groups and as hydrohalide salts of the amine nitrogen in the prepolymer. When the amine hydrohalide salt groups are derived from the haloalkanol groups there remains in place of the haloalkanol groups an epoxyalkyl group. These epoxyalkyl groups and the halogen which has transferred from the haloalkanol groups to the amine nitrogens as hydrohalide salts are still present in the composition as "haloalkanol equivalents." In the embodiments contemplated by me it is desirable to keep the products of this invention in the prepolymeric state until they are used, for example, in polysaccharide treating applications, where the prepolymer compositions are allowed to set up or polymerize to insoluble crosslinked polymeric materials in the medium of the substrate, for example, in cellulose fibers of pulp used in making paper. The amine hydrogens are supplied by either the prepolymer component (a) or by one or more amines, epihalohydrin-amine adducts, or prepolymers of epihalohydrin-amine adducts and amines, that is, by components (b), (c), (d), etc. The prepolymer compositions are preferably maintained in solution or suspension in the solvent or diluent used in preparing them, such as in a lower alkanol, for example, methanol or isopropanol.

PREPOLYMER COMPONENT

The simple prepolymer component (a) of the composition of this invention is the reaction product of (1) an adduct of an epihalohydrin and an amine having at least 1 primary amino nitrogen and at least 2 amino hydrogens, said adduct having at least 2 molar equivalents of the epihalohydrin per mole of amine used in preparing said adduct, and (2) an amine having at least 2 amino hydrogens. When the amine used to prepare the adduct are diamines, triamines, or higher polyamines, the adduct preferably contains more than two molar equivalents of the epihalohydrin per mole of amine used, and may contain, say, up to 7 or 8 or 10 such molar proportions of the epihalohydrin per mole of amine. The adduct must retain active haloalkanol equivalents to be useful in preparing the products of this invention, and hence care should be taken in their preparation to avoid formation of complex mixtures of polymeric materials. I have prepared such adducts by condensing an epihalohydrin with an amine the molar ratio of epihalohydrin being determined by the number of amino hydrogens in the amine, that is, the moles of epihalohydrin being approximately equal to the number of hydrogen atoms bonded to amino nitrogens, preferably a molar excess of say, from 2% to 20% of epihalohydrin based on the number of amino hydrogens. The adduct is prepared by combining the epihalohydrin and amine in the presence of an inert, non-reactive solvent or diluent, such as the liquid alkane hydrocarbon (hexane, heptane) or as is preferred in a lower alkanol such as methanol, ethanol, isopropanol, etc. with methanol being especially preferred, at low or ordinary room temperatures at atmospheric pressure. The temperature should not be above 50° C. and temperatures on the order of from 20 to 35° C. are preferred.

The reaction between the amine and the epihalohydrin to prepare the adduct (1) is conducted in the presence of at least a trace amount of an hydroxyl-containing material, preferably a low molecular weight, volatile alcohol, such as methanol, ethanol, or propanol, most preferably methanol which can be used as solvent, partial solvent, or diluent for the reaction mixture as well as the catalyst. The hydroxyl-containing material needed to start the reaction can be supplied in a variety of ways. For example, the small amount of water normally present in some commercially available solvents such as hexane, heptane, etc. is sufficient to initiate the reaction. However, water is not generally desired as a solvent for this reaction. The hydroxyl-containing material can also be supplied by some of the reaction product, that is, the adduct itself, since such adduct contains hydroxyl groups. The hydroxyl-containing material can also be any other hydroxyl compound, a few examples of which are phenol, alkylene glycols such as ethylene glycol, propylene glycol, etc. The provision of the hydroxyl-containing material to initiate the reaction is critical in the sense that in its absence the reaction between the epihalohydrin and the amine does not take place. For example, attempts to conduct the reaction using dry hexane as solvent resulted in no adduct being formed. However, for most purposes small amounts of hydroxyl-containing material needed to initiate the reaction can be supplied by any source such as are indicated above with no other requirements as to type, amount, etc. being critical. The reaction is conducted at low temperatures, generally on the order of from 0 to 50° C. at atmospheric pressure, with temperatures of from 20 to 35° C. being preferred. Time periods ranging from 1 to 100 hours are generally sufficient to afford time for a complete as possible addition of epihalohydrin on the amino nitrogen atoms. Specific time periods within this range can be optimized by those skilled in the art and will vary depending upon the reactants chosen, the solvent, the molar proportion, the temperature used, etc. When the reaction is completed any excess epihalohydrin together with most of the diluent or solvent is removed at low temperatures, not above 50° C., from the adduct obtained, preferably by distilling or flashing off said materials under reduced pressure. It is not essential to remove all of any diluent or solvent but it is preferred to remove substantially all of the excess epihalohydrin. Some additional aspects of preparing said adducts are disclosed in applicant's copending application, S.N. 212,438, filed July 25, 1962, which is incorporated herein by reference.

One of the features of this invention which is useful for enhancing the rapid development and permanency of sizing or other activity of the prepolymer compositions of this invention on cellulosic paper products is the use of an "aged" adduct as one of the reactants. An "aged" adduct is one which has been allowed to stand for some time or which has been heated for a short time before it is reacted with the prepolymer reactant (a) in preparing the multi-component prepolymer composition of this invention or with other amine, or adduct reactants in preparing prepolymer reactants. The degree of "aging" of the adduct can be conveniently measured by means of the "neutralization equivalent." The freshly prepared adduct generally has an amine neutralization equivalent from about 150-400 as determined using the Durbetaki reagent (Durbetaki, A. J., Anal. Chem., 28, 2000 (1956)). I have found that when the adduct has been allowed to stand or is heated for a time sufficient to raise the neutralization equivalent to, say 200-700, and then reacted with either an amine in preparing the prepolymer, or with another prepolymer, in the proportions indicated, the prepolymers so obtained, when applied to paper in general give improved, "off machine" sizing characteristics over similar prepolymer compositions prepared from "freshly prepared" adduct under otherwise identical conditions, and give substantially improved tensile strength to the treated paper according to standard paper test methods. However, prepolymer compositions prepared from "fresh" adducts by the reaction of such with either prepolymer compositions or with other amines to prepare prepolymers as reactants in this invention are included herein, and exhibit substantial permanent sizing of cellulosic paper products.

The adduct, especially prepared as described above, may be reacted immediately with an amine in preparing the prepolymer reactants for preparing the compositions of this invention.

For paper sizing applications it is necessary that at least 1 component of the prepolymer composition have an hydrophobic group bonded to a nitrogen atom of the prepolymer molecule. Such groups are preferably alkyl or alkenyl radicals having at least 10 carbon atoms, or acyl radicals of the formula R'''C(O)— having at least 10 carbon atoms in said R''' group such as those from decanoic acid, oleic acid, palmitic acid, tetradecanoic acid, hexadecanoic acid, tetracosenic acid, etc. Other hydrophobes containing amine groups which may be used are those obtained by condensing fatty acids, dibasic acids, or dimer and trimer unsaturated aliphatic acids, such as sebacic acid, dodecanedioic acid, octadecanedioic, docosanedioic acids, etc. with amines to obtain amidoamines having carbon chain branches of at least 10 carbon atoms.

For imparting wet and dry strengths and dimensional stability characteristics to cellulosic materials, the presence of hydrophobic groups in the prepolymer may not be desired. In such cases it is preferred to use amines having only hydrogen or lower alkyl groups of not over say, 6 carbon atoms bonded to the nitrogen.

However, for certain uses such as sizing agents with improved dry strength it is advantageous to combine the prepolymer compositions having hydrophobic groups with other components, either adducts, amines, or other prepolymers having no hydrophobic groups to achieve modified polysaccharides not obtainable with either hydrophobic or hydrophilic prepolymers alone.

It is a particular embodiment of this invention, therefore, to provide prepolymer compositions possessing hydrophobic and hydrophilic properties by contacting and reacting, for example, at ambient conditions and/or warming, and stirring, a prepolymer component (a) with (b) a component which is either an adduct, an amine, or prepolymer either or both (a) and (b) having hydrophobic groups to obtain a prepolymer composition.

After the prepolymer composition has been prepared it is usually desirable to dilute the prepolymer composition solution with water to reduce the concentration thereof to the level at which it will be applied to the polysaccharide substrate such as starch, textiles such as cotton, linen, rayon, and cellulose paper products, etc. In some applications of the prepolymer compositions of this invention, particularly as cellulosic paper treating agents it may be desirable to raise the pH of the diluted aqueous prepolymer composition to, say, pH 10–13 prior to applying or mixing said prepolymer composition to the paper or with the pulp slurry used to make said paper. The pH may be raised by any means known in the art. Generally, the pH is raised by adding a strongly alkaline reacting aqueous chemical solution thereto such as an alkali metal or alkaline earth metal oxide or hydroxide. Practical examples of such materials are $Na_2O$, $K_2O$, CaO, BaO, NaOH, KOH, $Ca(OH)_2$, etc. After the pH has been raised to the higher pH, the diluted aqueous prepolymer composition is applied to the substrate, particularly cellulosic pulp. I have found that this alkaline treatment of the prepolymer composition just before application to the substrate substantially increases the effectiveness of some of the prepolymer compositions as sizing agents and tensile strength improving agents.

In preparing the prepolymer reactant (a) of this invention it is essential that at least one of the adduct (1) or amine (2) be at least trifunctional, that is, it must have 3 reactive sites or groups therein. When the adduct (1) is trifunctional it has 3 haloalkanol groups or its equivalent bonded to nitrogen or at least two such haloalkanol groups and at least 1 active amino hydrogen er molecule. When the amine (2) is trifunctional it as at least three amino hydrogens per molecule, and these are preferably primary amino hydrogens. This requirement is essential to the preparation of the compositions of this invention so that when the prepolymer composition is applied to the polysaccharide substrate crosslinking will take place to obtain the desired insoluble gel. The adduct (1) and amine (2) are combined in proportions such that the adduct reactant (1) furnishes or provides a minimum total of at least 3 haloalkanol equivalents and the adduct and the amine reactant (2) together provide a minimum total of at least 3 amino hydrogen equivalents, and the sum total of haloalkanol and amino hydrogen equivalents in the two reactants (1) and (2) is at least 6. For most purposes it is preferred that the sum total of haloalkanol and amino hydrogen equivalents in the two reactants be from 6 to 14. For example, when the adduct (1) used is N,N-bis-(3-chloro-2-hydroxypropyl)-n-octadecylamine, prepared by adding two moles of epichlorohydrin to one mole of n-octadecylamine, and the added amine (2) is N-n-octadecyl-1,3-propylenediamine, there is used at least 1.5 moles of the adduct per mole of (2) to provide a minimum ratio of 3 chloropropanol groups for the 3 amino hydrogens in the amine reactant (2). The adduct (1) and the amine (2) ratio can be chosen so that the haloalkanol group equivalents in the adduct molecules averages over 3, say, 3.1, 4.4, etc. Similarly, the amino hydrogen content for any given reaction mixture can vary over 3. The number of haloalkanol and amino hydrogen equivalents signify chemical equivalents of the functional groups and not molar proportions of reactants. In excess of the given minima of haloalkanol and amino hydrogen equivalents, the relative proportions of the two reactants can vary extensively. For example, an adduct mixture containing an average of 3.8 haloalkanol groups per molecule can be admixed with sufficient amount of an amine to provide an amino hydrogen equivalence of, say, 5.8.

The above requirements follow from a consideration of the theory of gelation or crosslinking of polymers described by Carothers (H. Mark and G. S. Whitby, editors, "Collected Papers of W. H. Carothers on High Polymeric Substances," Interscience Publishers, Inc., New York, 1940). The critical degree of reaction ($P_c$) for gelation is related according to Carothers to the average functionality ($f$) by the equation:

$$P_c = 2/f$$

The average functionality for equal numbers of complementary reaction groups is defined as the total equivalents of reaction sites divided by the total number of moles of both monomers used. Thus, if two moles of a trifunctional monomer and three moles of a complementary or co-reacting bi-functional monomer are taken, the average functionality is:

$$f = \frac{2 \times 3 + 3 \times 2}{2+3} = \frac{6+6}{5} = \frac{12}{5} = 2.4$$

Then the degree of reaction to obtain gelation is $$P_c = 2/2.4 = .83$$

That is, 83% reaction is predicted to produce an insoluble crosslinked polymer. Furthermore, cross-linking of complementary monomers occurs only if at least one of the complementary monomers has more than two reactive sites, according to Carothers. If the reaction is highly efficient, the functionality may consist of equal proportions of the two complementary reaction sites. If a monomer may undergo side reactions, i.e., reactions which do not contribute to polymerization, e.g., cyclization intramolecularly, proportionately more of such a monomer must be utilized.

The above amine-halohydrin adducts are relatively inefficient and depending on the adduct and on the added amine and their reactivity, the efficiency may vary in the range 50% to 90%; thus up to 100% functional excess of adduct is required to react completely with the added amine. Complete reaction is nearly impossible to achieve because once gelation begins; the polymer is not completely mobile and reactive groups may not approach complementary sites.

An advantage of the prepolymer compositions of this invention is that by suitable selection of the prepolymer reactant (a) and one or more reactants, (b), (c), (d), etc., from the group of amines, adducts, and prepolymers having the required functionality, as defined above, there are obtained water soluble or dispersible products which are easily applied to paper products, for example, to obtain such paper products having highly improved sizing and tensile strengths. Sufficient functionality must be provided to produce gelation or insoluble polymer formation under the relatively mild curing conditions available to the papermaker, while maintaining a soluble low molecular weight form until use. In general, the minimum degree of reaction for gelation, the critical value $P_c$, will be in the range 40–80%.

Since efficiency of the simple prepolymer reactants, and adducts is rarely above 80% in practice the value of $f$ must be increased to $$f = 2.4/.8 = 3.0$$

The use of haloalkanolamines provides a self-limiting prepolymer synthesis within the ranges required. That is, the haloalkanols do not themselves co-polymerize with the added amines under the conditions employed. Nor do amine hydrohalides react readily with glycidyl groups. However, glycidyl groups readily condense with primary and secondary amines. Thus, as hydrogen halide transfers to basic nitrogen, and glycidyl groups are generated to condense with free primary and secondary amino groups. However, the process is self-limiting in that, as it proceeds, fewer basic nitrogens and also fewer unchanged haloalkanolamine groups remain. Also some dissociation of the amine hydrohalides occurs, establishing in effect an "equilibrium" point beyond which the polymerization does not proceed under a given set of conditions. As long as this degree of reaction is less than the critical degree, $P_c$, as calculated by the method outlined above, gelation will not occur and the product is a stable prepolymer which may be prepared and stored, dissolved or dispersed in water or other solvents such as alcohols.

It is clear that the transferred hydrogen halide is the critical component in preventing premature gelation. It is only necessary to neutralize or hydrolyze the hydrohalide salts in order to allow the reaction to proceed to and beyond the critical degree and give an insoluble crosslinked or gelled polymer if the functionality has been chosen as outlined above.

Conversely if higher functionalities ($f$) are employed it may be necessary to add hydrogen halide or other acids such as acetic, sulfuric, phosphoric, and nitric acids, to the reaction mixture in order to control the reaction, that is, to prevent gelation, by further limiting the degree of reaction. For instance, an average functionality of 5 leads to $P_c = 2/5 = .4$ or only 40% reaction.

An example is the formation of a prepolymer from the adduct of N-(n-octadecyl)tripropylenetetramine with 5 epichlorohydrin and monostearoyltetraethylenepentamine. Both adduct and added amido-amine are pentafunctional or the average functionality, ($f$), is also 5.

$$f = \frac{5+5}{1+1} = \frac{10}{2} = 5; \quad P_c = \frac{2}{5} = .4$$

In such cases gelation almost invariably occurs unless an acid is added before pre-curing; for instance, three equivalents of concentrated hydrochloric acid added to the adduct solution, followed by the amine in a 1:1 molar ratio and pre-curing 2 hours at 60–70° C., will produce a stable dispersible prepolymer solution. In general it may be necessary to neutralize up to 50% of the basic nitrogens to prevent premature gelation.

AMINES

Among the classes of aliphatic amines which may be used to prepare the adducts, and the simple prepolymer reactants, as well as to react with said simple prepolymers and adducts, are primary alkylamines having from 1 to about 24 carbon atoms, primary alkenylamines having from 3 to about 24 carbon atoms in which the olefinic double bond of the alkenyl group is not closer to the amine nitrogen than two carbon atoms, i.e., the olefinic double bond is no closer than the beta ($\beta$) carbon atom, relative to the nitrogen atom, alkylenediamines having from 2 to 6 methylene groups between the amino groups, N-alkyl- and N-alkenylalkylenediamines wherein the alkyl and alkenyl groups are as defined above, mixtures of N-alkyl- and N-alkenylalkylenediamines of the type described above, dialkylenetriamines, trialkylenetetramines, etc., and polyalkylenepolyamines which can be described generically by the formula

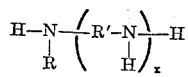

wherein R' is an alkylene group having from 2 to 6 carbon atoms, $x$ is an average number integer of from 2 to 10, and R is either hydrogen, an alkyl group of from 1 to 24 carbon atoms, or an alkenyl group of from 3 to 24 carbon atoms, and amido-amines which contain 1 or more amido groups and are obtained by reacting 2- to 24-carbon alkanoic acids, 3- to 24-carbon alkenoic acids, 4- to 24-carbon alkanedioic acids, alkenedioic acids having from 4 to 40 carbon atoms with a dialkylenetriamine, alkylenediamine or a polyalkylenepolyamine of the types described above, in which the acid used in preparing said amido-amine compounds may be monomer, dimer, and trimer acid mixtures.

Other aliphatic amines which may be used for preparing adducts and prepolymer reactants or per se as the amine reactants in preparing the prepolymer compositions of this invention are the polyalkyleneoxy ether diamines having molecular weights of from about 500 to about 8000 which may be obtained by cyanoalkylating the terminal hydroxy groups of polyalkyleneoxy ether glycols and reducing the terminal cyano groups to amino groups, or by aminating polyether dichlorides, and copolymeric reaction products of an approximately equimolar ratio of polyalkylenepolyamines of the type described above and an epihalohydrin, prepared in the presence of excess alkali to dehydrohalogenate the haloalkanol groups as soon as they are formed, forming epoxyalkyl groups which react with the amino hydrogens to form a lower polymeric amine particularly useful as an amine reactant in forming prepolymer compositions of this invention which impart excellent wet and dry strength and dimensional stability to paper products treated therewith, or if they bear hydrophobic groups, excellent sizing accompanied by good dry tensile strength.

The above types of amine compounds that may be used in the process of this invention are those having at least two amino hydrogens per molecule and include ammonia, lower alkyl primary monoamines such as methylamine, ethylamine, isopropylamine, mixed amylamines, hexylamines, as well as the alkylenediamines, triamines, and polyamines such as ethylenediamine, propylenediamine, butylenediamine, hexylenediamine, diethylenetriamine, dipropylenetriamine, diphenylenetriamine, triethylenetetramine, tributylenetetramine, trihexylenetetramine, tetraethylenepentamine, tetrapropylenepentamine, pentaethylenehexamine, pentapropylenehexamine, N-ethyl-1,2-ethylenediamine, N-propyl - 1,3 - propylenediamine, N-hexyl-1,4-butylenediamine, N-butyltriethylenetetramine, N-hexyltripropylenetetramine, and N-pentyltetrabutylenepentamine.

Amido-amine compounds that are the condensation product of lower alkanoic acid and amines may also be used. A few examples are those resulting from the condensation of acetic acid, propionic acid, butanoic acid, pentanoic acid, hexanoic, or heptanoic acid with an aliphatic alkylenediamine, triamine, polyamine as described above.

An important class of amido-amines useful for the purposes of this invention are those resulting from the condensation of alkanedioic acids having up to 10 carbon atoms therein with an alkylenediamine, triamine, or polyamine as described above. The acids such as succinic acid, glutaric acid, adipic acids, sebacic acids etc., may be condensed with sufficient alkylenediamine, triamine, or polyamine to provide from 2 to 6 amino nitrogen atoms. The amino nitrogen atoms and the hydrogens bonded thereto are not counted in determining the maximum extent of epihalohydrin reaction, since no epihalohydrin will add to such amido nitrogen atoms under my conditions.

For polysaccharide sizing applications the amine used in preparing the adduct starting material (1) or the amine reactant (2) and preferably both (1) and (2), contains a hydrophobic alkyl or alkenyl radical bonded to nitrogen. Such hydrophobic groups are those having at least 10 carbon atoms. The upper limit of carbon atoms in such radicals is not critical, but generally such radicals having up to about 24 carbon atoms are preferred. Examples of such useful amines are: decylamine, dodecylamine, tridecylamine, tetradecylamine, hexadecylamine, octadecylamine, eicosylamine, tetracosylamine, 6-tetradecenylamine N-n-octadecenyl - 1,3 - propanediamine, N-docosyltriethylenetetramine, N-tetracosenyl-1,3-propanediamine, etc. For economic reasons commercial mixtures of amines having mixed higher alkyl or alkenyl-amines, or mixtures of alkyl and alkenyl amines are used. Examples of such commercial mixtures are those wherein the alkyl or alkenyl moiety is obtained from natural oils such as coconut, soybean, peanut, tallow, fish oils, and other animal and vegetable oils, which when converted to the amines have as the alkyl moiety a mixture of $C_{10}$ to $C_{22}$ alkyl- and alkenylamines. Examples of such commercial mixtures are Armour and Co.'s "Duomeen C," "Duomeen T," "Duomeen O" and Archer-Daniels-Midland Company's Adogens 570, 501, and 551, etc. These and other synthetic mixtures of di-, tri- and higher polyamines, up to about heptamines may be obtained by cyanoalkylating a long chain alkyl or alkenylamine e.g., n-octadecylamine and reducing with hydrogen the product so obtained, such products are often not completely hydrogenated, but such products still containing alkenyl groups therein may be used.

Useful amido-amines are obtained for example by condensing linoleic and dilinoleic acids with alkylene diamines and polyalkylene amines. For example, by condensing linoleic acid with polyalkylenepolyamines, there is obtained, an amido amine of the formula

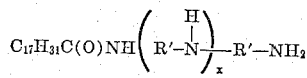

wherein $x$ is a whole number of from 1 to 4, and R' denotes a lower bivalent alkylene radical such as ethylene, propylene, butylene, amylene, or hexylene. Similarly, amido-amines obtained from dimer acid compositions may also be obtained. Examples of such compounds are those obtained by condensing dimers of, say, sorbic acid, geranic acid ($C_{10}H_{16}O_2$) palmitolic, linoleic acid, sterolic acid, humoceric acid ($C_{19}H_{34}O_2$), eicosinic acid, etc., with an alkylenediamine or polyalkylenepolyamine. Such amido-amine compounds may be described as having the general formula

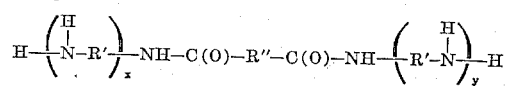

wherein R', x, and y are as defined above and R" denotes a bivalent straight, branched, or carbocyclic alkylene or alkenylene radical derived from the dimer acid composition that was used, and preferably containing from 16 to 40 carbon atoms.

A new type of essentially linear polymeric amine which may be used as an amine reactant in preparing the prepolymer compositions of this invention is an alkaline condensation copolymer of an N-alkyl alkylenepolyamine and an epihalohydrin. This class of copolymer amines may be described by the general formula

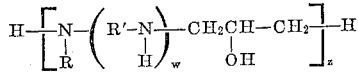

wherein $w$ is an integer of from 1 to 4, and $z$ is an integer averaging from 2 to 20, R' is an alkylene radical having from 2 to 6 carbons, and R is hydrogen, an alkyl group having up to 24 carbon atoms, or an alkenyl radical having from 3 to about 24 carbon atoms. When R is alkenyl the olefinic double bond thereof is not closer than 2 carbon atoms to the nitrogen.

Copolymeric amines of the above formula wherein R is an alkyl or alkenyl radical of at least 10 carbon atoms are especially valuable and useful in preparing prepolymer compositions which impart sizing characteristics to the substrate, e.g., paper, to which they are applied.

These copolymeric amines should not be confused with monomeric adducts of amines and at least 2 epihalohydrins which adducts are reacted with amines or prepolymers in the process of preparing the prepolymer compositions of this invention. These amines contain no bound halogen, having had the halogen removed by the alkaline material used in the reaction, and are made from substantially one mole of amine per mole of the epihalohydrin.

Such copolymeric amines may be prepared by adding a molar equivalent amount of an epihalohydrin slowly to a mixture of the chosen alkylenepolyamine and an alkaline material which is present in at least an equimolar amount over a period of about 0.5 to 1.5 hours, preferably with stirring, at a temperature of from about 60° C. to 120° C., preferably 80° C. to 100° C. The mixture so obtained is then heated at that temperature to insure complete reaction. Excess alkali is then neutralized with acid, and then the mixture is diluted with an appropriate solvent, e.g., a lower alkanol such as methanol. The inorganic salt by-product is then filtered off, leaving as filtrate a solution of the copolymeric amine which is eminently suited for use in preparing the several component prepolymer compositions of this invention.

For example, a useful copolymeric amine can be prepared by mixing and heating triethylenetetramine with an excess molar amount of sodium hydroxide, adding epichlorohydrin until approximately an equimolar amount, relative to the amount of amine used, is added, at the temperatures indicated above, heating the mixture until the reaction is complete, neutralizing the excess sodium hydroxide with hydochloric acid, diluting the mixture with enough methanol to dissolve the amine and filtering off the sodium chloride by-product, leaving a methanolic solution of the copolymeric amine.

Copolymeric amines of the above described types having long chain alkyl or alkenyl groups are new and are especially useful for preparing prepolymer compositions of this invention which have excellent paper sizing properties. For example a copolymeric amine may be prepared by condensing N-octadecyl-1,3-propanediamine with epichlorohydrin in approximately equimolar proportions in the presence of at least an equimolar amount of alkali such as sodium hydroxide or potassium hydroxide, calcium hydroxide, etc. as described above. After neutralization of excess base and removal thereof, the copolymeric amine thus obtained may be added to a prepolymer such as (an adduct of diethylenetriamine plus 5 moles of epichlorohydrin:diethylenetriamine::2:1), and warmed to give a prepolymer composition such as [(an adduct of diethylenetriamine plus 5 epichlorohydrin:diethylenetriamine::2:1): copolymeric amine::1:1] wherein the integers refer to molar proportions and the integers after the "copolymeric amine" refer to the mole: equivalent ratio of prepolymer to copolymeric amine.

Examples of such copolymeric amines are those obtained by the alkaline condensation of a one to one molar ratio of an epihalohydrin such as epichlorohydrin, epibromohydrin, etc., and an amine such as the diethylenetriamine, triethylenetetramine, tetraethylenepentamine, dipropylenetriamine, trihexylenetetramine, N-alkyl-1,3-propanediamines having up to about 24 carbon atoms in said alkyl radical, N-alkenyl-1,3-propanediamines having from 3 to about 24 carbon atoms in said alkenyl radicals, mixtures of N-alkyl- and N-alkenyl-1,3-propanediamines having an average of from 16 to 20 carbon atoms in said alkyl and alkenyl radicals, tetradecylamine, hexadecylamine, octadecylamine, octadecenylamine with the olefinic double bond between the 9 and 10 carbon atoms in the octadecyl radical, N-octadecyltriethylenetetramine, N-docosenyltetrapropylenepentamine, etc.

In the formation of these copolymeric amines the amines react with the epihalohydrin forming haloalkanol groups which are rapidly dehydrohalogenated by the alkali material which is present to form the epoxyalkyl groups which readily react with more amine giving mainly linear copolymeric amines. This mechanism provides a new convenient method for introducing several hydrophobic groups into one molecule of copolymer which are especially suited for use in preparing the prepolymers for paper and textile sizing applications.

Combinations of hydrophobic and non-hydrophobic amines may be used in the preparation of copolymeric amines containing proportionally fewer hydrophobic groups and higher amino hydrogen functionality. Mixtures of the two amines may be treated as previously described or one of them, usually that containing the hydrophobe, may be converted to an adduct, e.g., alkyl-1,3-propanediamine+2 epichlorohydrin which is then treated with equimolar amounts of polyamine such as triethylenetetramine and excess alkali, to give the mixed copolymeric amine.

In addition to the above aliphatic amines described there may be used as the aliphatic amine component which is added to the prepolymer component (a), or to a prepolymer composition containing a prepolymer component (a) as well as aduct or other prepolymer components, an aliphatic polymeric amine.

Examples of such polymeric amines are those of the formula

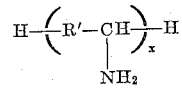

R' is a $C_2$–$C_6$ bivalent alkylene radical, preferably ethylene and $x$ is an average number of from, say, 10–40 obtained by the reductive amination of low carbon monoxide-olefin copolymers; reduced polyacrylonitrile polymers of the formula

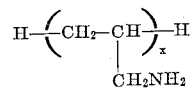

wherein $x$ is as defined above; and the type having a general formula

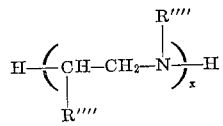

wherein R'''' is either hydrogen or an alkyl group, usually hydrogen, and x is as defined above, known generally as the polyethyleneimines.

Such aliphatic polymeric amine is generally used in an amount sufficient to substantially balance any excess haloalkanol groups present in the prepolymer composition prior to its addition. An amount which provides up to 1 amino hydrogen mole equivalent per mole of the prepolymer composition to which it is added is generally sufficient.

The epihalohydrin used in this invention has the essential group

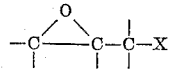

wherein epoxy group is bonded to two carbon atoms, one of which is bonded adjacently to a carbon atom having the halogen bonded thereto. The halogen is preferably chlorine for reasons of availability and cost, but may be bromine or iodine. The indicated free valences on the carbon atoms are satisfied by hydrogen or lower alkyl groups, preferably the methyl or ethyl groups. This same three carbon structure of the epihalohydrin is the source of the haloalkanol groups, namely (illustrated as being bonded to nitrogen).

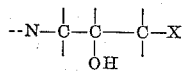

As above, the indicated free valences may be satisfied with hydrogen or lower alkyl groups. When hydrogen halide has been abstracted from the haloalkanol group, e.g., by an amino group as a hydrohalide salt, there remains in its place the three carbon epoxy group

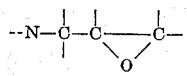

which is still considered "haloalkanol equivalent" since the total reaction mixture still contains the halogen, oxygen, and carbon content.

The epihalohydrin used in preparing the adduct starting material is preferably epichlorohydrin but may be epibromohydrin, epiiodohydrin, or one of the higher molecular weight vicinal halohydrins such as 3-chloro-1,2-epoxybutane, 3-chloro-1,2-epoxypentane, etc.

PROCESS

In preparing the complex prepolymer compositions according to the process of this invention the simple prepolymer component (a) is combined with one or more components of the types described above, either at once or in stepwise fashion i.e., by first combining the prepolymer component (a) with one component (b) say, e.g., an aduct of epichlorohydrin and an amine, stirring and possibly heating for a short period, and then adding another component (c) e.g., an amine having at least 2 amino hydrogens, etc. Alternatively, the prepolymer component (a) may be combined with a mixture of components, either adducts, amines, or other prepolymers. The components are preferably combined in the presence of a solvent or diluent such as hexane, heptane, ethanol, isopropanol or methanol. The components may then be allowed to stand but preferably are mixed by stirring at from 0° to 100° C. for from 0.5 to 100 hours. The specific temperature and time used are dependent upon the reactants choosen and the tendency toward gelation of the resulting multi-component prepolymer product.

The product thus obtained does not have to be separated from the solvent used for its preparation. However, if large excesses of solvent have been used, economic reasons any amount of solvent in excess of the amount desired can be volatilized to leave as product, a prepolymer composition in solution, e.g., of 20% to 80% by weight concentration.

A few examples of simple prepolymers that may be used as reactants in this invention are given below defined in terms of the epihalohydrin-amine adduct and the amine used to prepare them. In these examples the adduct is described first, then the amine, and then a typical molar ratio of the adduct to amine is given:

N-n-octadecyl - N,N',N'-tris(3-chloro-2-hydroxypropyl)-1,3-propanediamine and N-n-octadecyl-1,3-propanediamine, in a 1.75:1 ratio;

An adduct of diethylenetriamine plus five molar equivalents of epichlorohydrin and n-octadecylamine, in 1:2 ratio;

An adduct of tetraethylenepentamine and six molar equivalents of epichlorohydrin and diethylenetriamine in a 1:1 ratio;

N,N,N-tris(3-chloro-2-hydroxypropyl)amine and dodecylamine in a 1:1 ratio;

An adduct of triethylenetetramine plus 5 epichlorohydrin and N-stearoyldiethylenetriamine in a 1:1.25 ratio;

An adduct of an amido-amine prepared by reacting linoleic acid with diethylenetriamine in a molar ratio of 1:1 plus 3 epichlorohydrin and n-dodecylamine in a 1:1 ratio;

An adduct of a mixture of N-alkyl-1,3-propanediamines wherein the alkyl groups have from 14 to 20 carbon atoms therein plus three moles of epichlorohydrin and an amido-amine prepared by reacting a mixture of olefinic dimer acids having an average of from 30 to 40 carbon atoms and dipropylenetriamine, in a 1:1 ratio;

An adduct of N-n-octadecylamine and two moles of epichlorohydrin and polyethylene ether diamine having a molecular weight of about 2000–2200 in 2:1 ratio.

It should be noted that the above simple prepolymer examples with the illustrated ratios are nearly balanced products in terms of amino hydrogen and haloalkanol (epihalohydrine residue) functional groups. They are suitable for reaction with small ratios of other adducts, prepolymers, or amine reactants depending upon which functional group is in slight excess.

When it is desired to react simple prepolymers with larger amounts of other adducts, amines or other prepolymers having a larger excess of functional haloalkanol or amino hydrogen functionality available for reaction, the simple prepolymer used should be one designed to have an excess amount of the counterpart amino hydrogen or haloalkanol groups so the final reaction product will be a prepolymer having an approximately balanced amino hydrogen and haloalkanol functional group content. For example, when the user contemplates preparing a prepolymer composition using an economical amine having a relatively large number of amino hydrogens per molecule, the simple prepolymer reacted therewith should have a corresponding excess of haloalkanol functional groups. Thus, a two-component prepolymer composition can be prepared having a small number of hydrophobic groups therein by reacting, say, a simple prepolymer: (an adduct of triethylenetetramine and an average of 5 moles of epichlorohydrin per mole of an amine, and N-n-octadecylamine:1:1) with a copolymeric amine derived by the condensation of diethylenetriamine and epichlorohydrin reacted in a 1:1 ratio in the presence of excess alkali, said copolymeric amine having about 3 moles available amino hydrogens per copolymer unit, in a 1:1 mole:unit ratio of said simple polymer to copolymeric amine.

The following examples illustrate the prepolymer compositions of this invention. The first component (a) of these compositions is the prepolymer reactant defined in terms of the adduct and amine from which it was derived with the molar ratio thereof in parenthesis ().

The definition of the second component (b) which is either an adduct, an amine, or another prepolymer, follows a colon after the parenthesis and is enclosed within a bracket [ ] with the molar ratio of the prepolymer component (a) to the component (b). If a third component (c) is added it is defined after a colon which follows the bracket followed by molar ratio in [(a):b]:c. If a fourth, fifth, etc. component is added the prepolymer composition is defined as above with the brace "{}" enclosing the definition of component (d) and its molar ratio of components in {[(a):b]:c}:d. The molar rato given after the definition of the fourth component "d" is the ratio of the product {[(a):b]:c}:d. All ratios are mole ratios unless indicated to be mole: equivalent ratios. Any subsequent components follow a colon which follows an enclosing symbol such as another parenthesis, bracket, brace, etc.

In the examples illustrated a molar basis between the given reactants (a) and (b), [(a):b] and (c), etc. is assumed for the measurement of ratios. These ratios are based on the minimum number of theory moles, that is, the minimum component is used to determine the ratio. For example, when the prepolymer (a) (an adduct of N-n-octadecyl-1,3-propanediamine plus 3 moles of epichlorohydrin per mole of amine: diethylenetriamine::2:1) is reacted with an amine (b) such as N-n-octadecyl-1,3-propanediamine, the molar ratio of the prepolymer reactant (a) is determined on the basis of lower number, namely, 1. So, to obtain an approximate balance of haloalkanol and amino hydrogen functional groups in this prepolymer reaction system there should be used 3 moles of prepolymer reactant (a) and 1 mole of amine reactant (b). Variations from an exact balance may be desirable in order to modify the curing rate, etc., after application to cellulose products.

Examples of two component prepolymer compositions derived from components having hydrophobic groups therein are the following:

(N - n-octadecyl - N,N'N' - tris(3-chloro-2-hydoxypropyl) - 1,3 - propanediamine:octadecylamine::1:1):N-decyl-1-6-hexylenediamine::3:1(prepolymer plus amine).

N,N-bis(3-bromo - 2 - hydroxypropyl)decylamine:N-alkyl-1,3-propanediamines wherein the alkyl group has from 14 to 20 carbon atoms ::2:3): an adduct of an amido-amine derived from the reaction of linoleic acid and triethylenetretramine with 5 moles of epichlorohydrin::2:1 (prepolymer plus adduct).

(An adduct of an amido-amine derived from the reaction of adipic acid and diethylenetriamine with 3 moles of epichlorohydrin:N-alkyl-1,3-propanediamine wherein the alkyl group has from 14 to 20 carbon atoms::1.75:1): (N-eicosenyl-N,N'N'-tris(3 - chloro - 2 - hydroxypropyl)-1,3 - propanediamine: N - n-octadecylamine::1:2)::1:2 (prepolymer plus perpolymer).

Examples of two component prepolymer compositions of this invention having no hydrophobic groups are the following:

(An adduct of butylenediamine plus an average of 3.2 epichlorohydrin per mole:diethylenetriamine::2:1):polypropylene ether diamine having a molecular weight of from 2200–2400::4:1 (prepolymer plus amine).

(An adduct of tripropylenetetramine with an average of 4.6 epichlorohydrin moles: amido-amine from diethylenetriamine and acetic acid::1:2):a 1:1 amido-amine of succinic acid and triethylenetetramine plus an average of 3.1 epichlorohydrin per mole of amine::3:1 (prepolymer plus adduct).

N - ethyl - N,N'N' - tris(3-chloro-2-hydroxypropyl)-1,3 - propanediamine:N - butyltriethylenetetramine:::2:1):(an adduct of an amido-amine derived from sebacic acid and triethylenetetramine plus an average of 4-epichlorohydrin moles: dipentylenetriamine:1:1)::1:1 (prepolymer plus prepolymer).

(An adduct of triethylenetetramine plus an average of 5 epichlorohydrins per mole of amine: diethylenetriamine::1.5:1):polyethyleneimine having a molecular weight of from 30,000–50,000::2:1 moles of prepolymer to amino hydrogen equivalent.

Examples of three component prepolymer compositions of this invention having a hydrophobic group in at least one component are:

[(An adduct of diethylenetriamine plus 4.8 epichlorohydrin moles per mole of amine:N-n-octadecyl-1,3-propanediamine::1.5:1):an adduct of triethylenetetramine plus 5.6 epichlorohydrins per mole of amine::1:1]:a mixture of N-alkyl-1,3-propanediamines having an average of 20 to 22 carbon atoms in the alkyl groups::1:3;

[(N - hexyl - N,N',N'-tris(3-bromo-2-hydroxypropyl)-1,3 - propanediamine:tridecylamine::1.75:1):octadecylamine::1:4]:an adduct of triethylenetetramine plus an average of 5.1 epichlorohydrin moles per mole of amine::1:1; and

[(An adduct of an amido-amine derived from palmitolic dimer acid and tripropylenetetramine plus an average of 3.4 epichlorohydrin moles per mole of amido-amine: diethylenetriamine::2:1):(an adduct of diethylenetriamine plus an average of 4.7 epichlorohydrin moles per mole of amine:octadecylamine::1:2)::1:1]:diethylenetriamine::2:1.

[(An adduct of N-alkyl-1,3-propanediamines having from 14 to 20 carbon atoms in the alkyl groups plus 3 epichlorohydrins per mole of amine: diethylenetriamine::2:1):an adduct of a diamido-polyamine derived by the condensation of succinic acid with tetraethylenepentamine and an average of 3.8 epichlorohydrins per molecule of diamido-polyamine::1:1]:a reductively aminated copolymeric amine of carbon monoxide and ethylene having a molecular weight of from about 2200 to 2400::1:1 moles:equivalent.

Examples of three component prepolymer compositions of this invention having no hydrophobic groups are the following:

[(An adduct mixture of a mixture of di-, tri-, and tetraethylenetri-, tetra-, and pentamines, respectively, plus 4.8 average moles of epichlorohydrin:diethylenetriamine::1.5:1):an adduct of tripropylenetetramine plus 5.3 epichlorohydrins::1:1]:dihexylenetriamine::1:1;

[(An adduct of an amido-amine derived from the 1:1 reaction of glutaric acid and diethylenetriamine plus 2 epichlorohydrin: ethylamine::2:1:a polyethylene ether diamine having a molecular weight of from 2400–2600::1.5:1]:an adduct of diethylenetriamine plus 3.8 epichlorohydrin moles per mole of amine::1:2; and

[(An adduct of ethylamine plus two epibromohydrin: dibutylenetriamine::2:1):(an adduct of tetrapropylenepentamine+6.8 epichlorohydrin moles per mole of amine: an amido-amine derived from adipic acid and diethylenetriamine::1.5::1:1]:triethylenetetramine::1.5:1.

Examples of prepolymer compositions of this invention derived from more than three components, at least one of which is a simple prepolymer are the following:

{[N - n - octadecenyl-N,N',N'-tris(3-chloro-2-hydroxypropyl - 1,3-propanediamine:diethylenetriamine::1.5:1): an adduct of tributylenetetramine and an average of 4.6 moles of epichlorohydrin per mole of amine::1:1]:a mixture of N-n-alkyl- and N-n-alkenyl-1,3-propanediamines having an average of about 18 carbon atoms in each alkyl and alkenyl radical::1:2}:an adduct of octadecylamine and 2 moles of epichlorohydrin per mole of amine::1:2;

{[(An adduct of diethylenetriamine plus 5 moles of epichlorohydrin per mole of amine: an amido-amine which is derived from adipic acid and triethylenetetramine::1.75:1):(an adduct of a mixture of N-n-alkyl-1,3-propanediamines having an average of from 12 to 14 carbon atoms in the alkyl groups plus an average of 2.8 epichlorohydrins per mole of amine:a mixture of N-n-alkyl-1,3-propanediamines having an average of from 12 to 14 carbon atoms in the alkyl groups::1:2)::1:1]:an adduct of an amido-amine derived from 1:2 molar reaction of succinic acid and diethylenetriamine plus an average of 4.6 epichlorohydrins per mole of amidoamine::2:1}:triethylenetetramine::1:1; and

[(An adduct of triethylenetetramine and an average of 5 moles of epibromohydrin per mole of amine:diethylenetriamine::1:1):an adduct of a mixture of N-alkyl- and N-alkenyl-1,3-propanediamines having an average of 18 carbon atoms in each alkyl and alkenyl groups and 3 moles of epichlorohydrin per mole of amine::1:1]:a copolymeric amine which is the alkaline condensation product of a 1:1 molar ratio of tetraethylenepentamine and epichlorohydrin::5:3 (mole:unit ratio).

As stated above the reaction product of the invention is a prepolymer, that is, a low polymeric functional material still containing reactive haloalkanol groups, glycidyl groups, amino hydrogens, quaternarized nitrogens and amine hydrohalide salt groups. The amine hydrohalide salt groups are not removed from the multi-component prepolymer until further polymerization is desired, for example, in the cellulosic matrices of paper products. The retained hydrohalide salt groups serve to limit the extent of the reaction in the prepolymer and to make said prepolymer water soluble or at least water dispersible. When said multi-component prepolymer product is contacted with an aqueous medium, say, at pH 5 up to pH 13, preferably at pH 6 to 11, the hydrohalide salt groups are removed or hydrolyzed and polymerization proceeds to form an insoluble crosslinked polymer. This invention thus provides products with an inherently limited and stabilized degree of polymerization. To form said multi-component prepolymer it is essential that an adduct of an epihalohydrin and amine be used to prepare the prepolymer reactant and that this prepolymer reactant be reacted with additional adduct, amine, or another prepolymer.

In preparing the adduct, which is essential to prepolymer formation, the temperature of the reaction mixture containing amine and epihalohydrin is kept low, below 50° C. and preferably at about 10 to 35° C. to promote adduct formation, and to minimize any competing deleterious reactions which occur when higher temperatures are used. For example, at higher temperatures greater amounts of disproportionation reactions occur causing formation of bi-products, such as, dichlorohydrin (1,3-dichloro-2-propanol) when epichlorohydrin is used, and complex mixtures are partially and completely polymerized materials. The adducts used for reactions either with the prepolymer reactant (a) or with amines in preparing said prepolymer reactants (a) may be "fresh" adduct or "aged" adduct. The "fresh" adduct is one which contains very nearly the theoretical number of haloalkanol groups. As a practical matter, however, the adduct contains basic nitrogen and active haloalkanol group, and the basic nitrogen tends to abstract hydrogen halide from said haloalkanol groups, resulting in the formation of glycidyl groups from the remaining haloalkanol groups and hydrohalide salts of the basic nitrogen. An "aged" adduct is one with a measurable amount of its amino nitrogens are neutralized with the hydrohalide groups derived from the haloalkanol groups and a portion of the resulting glycidyl groups are condensed with amino hydrogen present in the adduct. Further, these glycidyl groups react with tertiary amino nitrogen to form quaternary ammonium salts.

The term "neutralization equivalent" (N.E.) used in this work is a measure of the hydrogen halide transfer plus the degree of dimerization or polymerization by alkylation and quaternization of the adduct and is expressed by the following equation $$N.E. = \frac{mg. \text{ of sample}}{me. \text{ of acid required for neutralization}}$$

The number of milliequivalents (me.) is obtained by multiplying the volume by the normality of the standard reagent required for neutralization to the crystal violet end-point. When a sample of adduct is titrated with a standard hydrogen bromide in glacial acetic acid reagent the total me. of reagent used measures the basic nitrogens not neutralized by hydrogen halide in the sample plus the me. of oxirane oxygens in the sample. Therefore, a "fresh" sample in which little hydrogen halide transfer has taken place would have a "neutralization equivalent" close to theory (lower N.E.) and would require more me. of standard reagent. An adduct which has "aged" somewhat by hydrogen halide transfer and condensation would require fewer milliequivalents of standard reagent and, therefore, have a higher neutralization equivalent. For example, a "fresh" adduct such as N-n-octadecyl-N',N'-bis (3 - chloro-2-hydroxypropyl)-1,3-propanediamine would have a neutralization equivalent nearly equal to the molecular weight divided by the number of amine nitrogens, i.e., 510/2=255. An "aged" adduct of the same material wherein one chloropropanol group had given one hydrogen halide to neutralize basic nitrogen, forming a glycidyl group which dimerizes with another similar molecule, would have a neutralization equivalent of 1020/3=340.

The "titer" of the multi-component prepolymer product is a measure of the amount of basic nitrogen which has been neutralized by transferred hydrohalide groups followed by addition of amino groups to the resulting glycidyl groups over and above the changes which occurred during aging of the adduct. It is expressed in terms of number of me. per gram of prepolymer. For example, a prepolymer which is said to have 90% of its original titer is one in which 10% of the basic nitrogens in the prepolymer are neutralized by transferred hydrohalide groups assuming no change in the glycidyl content. Similarly a prepolymer having 79% of its original titer is one in which 21% of the basic nitrogen therein has been so neutralized. This titer measurement is also an indication of the degree of dimerization and polymerization which has occurred between the reactants since the glycidyl groups generated by hydrogen halide transfer react with the added amine. Since the Durbetaki method measures both basic nitrogen and glycidyl groups, the change in titer ultimately measures the extent of condensation.

*Example 1*

This example illustrates the synthesis and improved performance of a two component prepolymer composition of this invention by adding an adduct to a previously prepared prepolymer.

A simple prepolymer was first prepared as follows:

To 25 g. of a refrigerated methanol solution containing 8.4 g. of an adduct of a commercial mixture tallow N-alkenyl- and N-alkyl-1,3-propanediamines, the alkenyl and alkyl radicals being predominantly $C_{16}$–$C_{18}$ ("Duomeen T"—Armour Industrial Chemical Co.) with three moles of epichlorohydrin (prepared by stirring the solution of reactants at 20°–25° C.; neutralization equivalent for the adduct, 342, or 102% of theory), there was added 7.05 g. of a tallow N-alkenyl- and N-alkyl-1,3-propanediamine ("Duomeen T"). After stirring to homogeneity, a sample of the resulting prepolymer was withdrawn for analysis.

This resulting solution in methanol was heated and stirred under reflux at 67° C. for an hour, cooled, and analyzed; the titer measured against standard anhydrous hydrogen bromide in acetic acid was 88% of the initial value.

To the cooled prepolymer solution, (a) thus obtained, there was added 13.9 g. of a refrigerated methanolic solution containing 7.2 g. of an adduct (b) of diethylenetriamine with five moles of epichlorohydrin. The adduct, so added, had been prepared as was the adduct used in preparing the prepolymer reactant (a) above, except that a 10% excess of epichlorohydrin in methanol was reacted with the diethylenetriamine initially at 20°–25° C., and after 89% reaction (21 hours) the excess epichlorohydrin was removed by aspiration to 30° C./1 mm. leaving the gummy adduct (b) corresponding to 96.5% reaction, based on a theory of 1 mole of diethylenetriamine:5 moles of epichlorohydrin; it had N.E., 199, compared to a calculated N.E. of 189.

The titer was measured and then the resulting mixture of prepolymer (a) and adduct (b) in methanol was heated under reflux at 67° C. and stirred for 2.5 hours and cooled. Analysis of the resulting prepolymer composition was 74% of the initial value.

The resulting prepolymer composition from "Duomeen T," a 49% by weight solution of prepolymer in methanol, may be designated as follows: (N-alkenyl- and N-alkyl-1,3-propanediamines plus 3 epichlorohydrin: N-alkenyl- and N-alkyl-1,3-propanediamines::1.3:2) (a):diethylenetriamine plus 5 epichlorohydrin-adduct (b)::1:1.3, the parentheses indicating the prepolymer reactant prepared first and the numbers the corresponding minimum mole ratios.

This material was applied to refined bleached Gatineau pulp slurry at the rate of 1% by weight based on the dry fiber and the treated pulp was sheeted into paper and dried on the Noble-Wood machine and drier. The finished paper was aged for 14 days at room conditions and then exhibited excellent sizing (3000 sec.; ink "flotation" method) and dry tensile strength which was 68% of an untreated sheet prepared similarly. At an application rate of 0.5%, based on the dry fiber, the "off machine" paper had a water resistance of 1700 sec. and 76% of the control dry tensile was observed.

These data represent a marked superiority over data obtained on paper sheets treated with prepolymers similarly prepared, from a simple prepolymer of an adduct and amine, alone. Thus, although a prepolymer ("Duomeen T"+3 epichlorohydrin (adduct):"Duomeen T" (amine)::2:1) gave very hard sizing (>6000 sec.) when the treated paper sheet was heat-cured for 1 hour at 105° C. in an oven, it exhibited only 53% of control dry tensile strength and "off-machine" sizing by ink penetration could be measured only to 470 sec. due to "wicking" of ink in from the cut edges of the sheet.

The 68% of dry tensile strength of an untreated control paper sheet exhibited by the prepolymer+adduct composition described above represents at least a 28% improvement in tensile strength whereas the tensile strength values of even below 50% were observed in paper sheets treated with similar simple prepolymer alone in related examples.

*Example 2*

This example illustrates that the ratio of the components and conditions need not be highly critical.

A prepolymer composition similar to that of Example 1 was prepared by mixing (1) an adduct of "Duomeen T" and an average of 2.6 epichlorohydrins per molecule, which adduct was aged at ambient temperatures until the N.E. was 146% of theory, (2) "Duomeen T," and (3) an adduct of diethylenetriamine plus 5 epichlorohydrins in a mole ratio of 2.7:2.1, respectively, and heating to reflux for 2.5 hours with stirring. Upon cooling the titer of the resulting prepolymer composition was then 68% of the initial value. Application at 1% to aqueous paper pulp, based on the dry fiber, also gave paper with good sizing and 68% of the dry tensile strength of the untreated control.

*Example 3*

A commercial mixture of tallow N-alkenyl-1,3-propanediamines in which about 45% by weight of the alkenyl groups are specified as being oleyl was first saturated by hydrogenation over finely divided metal catalysts (Pd, Rh) supported on charcoal and alumina. The resulting saturated diamines were used as illustrated below to prepare prepolymer compositions.

To a prepolymer, prepared by adding 0.52 g. of diethylenetriamine to 5.4 g. of a methanol solution containing 2.8 g. of an adduct of diethylenetriamine and 5 epichlorohydrins, heating and stirring for 30 minutes at 50° C., there was added 12.2 g. of an ethanol solution containing 5.35 g. of the hydrogenated diamines (N-alkyl-1,3-propanediamines in which $C_{18}$ alkyl predominates) prepared as described above. The resulting solution was heated at 70–73° C. for 75 minutes with stirring, cooled and then treated with 16.1 g. of an ethanol solution containing 9.25 g. of an adduct of the hydrogenated diamines, described above, with an average of 2.8 epichlorohydrins per molecule (prepared by mixing excess epichlorohydrin with the hydrogenated diamine mixture at 20°–25° C. until reaction based on 3 epichlorohydrins per molecule was indicated by analysis).

The resulting composition was heated at 75° C. for 2.5 hours with stirring. Decreasing titer was noted in each step of preparation. In this last step a decrease in titer to 66% of the initial value resulted. The resulting prepolymer composition was a 52% by weight alcoholic solution (methanol and ethanol) of the prepolymer which can be defined as follows:

[(Diethylenetriamine plus 5 epichlorohydrin:diethylenetriamine::1:1)hydrogenated diamine::1:3]:hydrogenated diamine plus 3-epichlorohydrin::1:3. Evaluation of this prepolymer:amine:adduct prepolymer composition showed improved performance compared to a simple hydrogenated diamine - epichlorohydrin:hydrogenated diamine prepolymer.

*Example 4*

A prepolymer (a) was first prepared by mixing 5.4 g. of a methanolic solution containing 2.8 g. of an adduct of diethylenetriamine plus 5 epichlorohydrin (prepared as described in Example 1) and 5.35 g. of a hydrogenated diamine mixture of the type N-alkyl-1,3-propanediamine (prepared as described in Example 3), and heating the mixture to 70° C., refluxing for 1 hour with stirring.

After cooling, the prepolymer solution prepared above was mixed with 10.8 g. of a solution containing 6.2 g. of an adduct of the hydrogenated diamine mixture, described above, plus 3 epichlorohydrin (95% complete addition) in ethanol. The resulting mixture was then heated to 75° C., stirred and refluxed for 2.75 hours. The resulting prepolymer composition was a translucent viscous product solution, 51% solids by weight containing the prepolymer defined as (diethylenetriamine+5 epichlorohydrin:hydrogenated diamine::1:3):hydrogenated diamine plus 2.8 epichlorohydrin::1:2.

*Example 5*

This example illustrates the preparation of prepolymer compositions of this invention by the reaction of two simple prepolymers.

A prepolymer was first prepared from an adduct of hydrogenated tallow N-alkenyl-1,3-propane diamine having from 14 to 20 carbon atoms in the alkenyl group+2.8 epichlorohydrin (allowed to react in ethanol below 30° until 94% reaction was indicated by analysis) which was then heated 75 minutes at 75° C. with stirring under reflux. The neutralization equivalent (N.E.) increased from 295 to 461 (156% of the initial N.E.) as a result of this heat-aging.

This solution (25 g., containing 15.5 g. of the "aged" adduct) was treated with 9.4 g. of an ethanolic solution of the above hydrogenated diamines (4.1 g. of hydrogenated diamine) and the mixture was stirred and heated to 75° C. under reflux for two hours. The titer had decreased to 69.8% of the initial value. The product was a 57% by weight solution in ethanol of the prepolymer: hydrogenated diamine+2.8 epichlorohydrin:hydrogenated diamine::2:1. When applied at 1% to pulp and the slurry formed into sheets, the paper had good ink resistance but only 48% of the dry tensile strength of the untreated paper.

A second prepolymer was prepared by treating 42.5 g. of a 51.7% by weight solution in methanol of the adduct diethylenetriamine+5 epichlorohydrin (22.2 g. of adduct) with 3.8 of 37–38% by weight concentrated reagent hydrochloric acid with stirring. To this adduct hydrochloride solution was added 4.1 g. of diethylenetriamine and the mixture was heated and stirred 2 hrs. at 66° C. under reflux with a resultant decrease in titer to 72.8% of the initial value. The product solution contained 46% by weight of the prepolymer:diethylenetriamine+5 epichlorohydrin monohydrochloride:diethylenetriamine::1:1.

A mixture of 14.9 g. of the solution of the first prepolymer (8.3 g. of prepolymer) with 2.5 g. of the second solution (1.1 g. of prepolymer) was heated and stirred at 70° C. under reflux for 30 minutes. Three phases separated: an upper light yellow solution, a viscous amber middle layer, and a very small amount of gelled solid. The two upper layers were mutually dispersed by shaking and decanted from the gel. The final dispersion-solution contained 53.4% by weight of the prepolymer: (hydrogenated diamine+3 epichlorohydrin:hydrogenated diamine::2:1):(diethylenetriamine+5 epichlorohydrin monohydrochloride:diethylenetriamine::1:1)::3:1.

It was applied to pulp at the 1% rate and the resulting paper was found to have good sizing combined with 64% of the dry tensile strength of the untreated sheet, a marked improvement over the 49% found under comparable conditions for the first prepolymer before modification.

*Example 6*

This example illustrates the preparation of a 2-component prepolymer, one of which components is a simple prepolymer, the other being a polymeric amine.

The first prepolymer of Example 5 (hydrogenated tallow diamine+2.8 epichlorohydrin:hydrogenated diamine::2:1) was treated with 3.1 g. of Polyether Diamine L-2000. This product of Union Carbide Chemicals Co. is said to have the formula

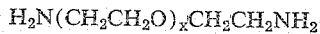

and was found to have an amine neutralization equivalent of 1130, corresponding to a molecular weight of 2260 based on this formula. The mixture was heated and stirred at 66° for 2 hrs. when the titer had decreased to 76.7% of the initial value. The product was a 60.5% by weight solution in ethanol of the prepolymer hydrogenated diamine+2.8 epichlorohydrin (156%, heat):hydrogenated diamine::2:1):Polyether Diamine L-2000:: 1:0.25.

Applied to pulp at the 1% rate the resulting paper had very hard sizing and retained 59% of the dry tensile strength of the untreated control sheet.

*Example 7*

This example described a prepolymer composition useful for improving the wet and dry tensile strength of paper, one of the components being a polymeric amine, the other a simple prepolymer.

The polymeric amine was prepared by adding a 5% molar excess of epichlorohydrin slowly to a mixture of tetraethylenepentamine and a 50% molar excess of 40% aqueous sodium hydroxide stirred and maintained initially at 60° and finally up to 80° to complete the reaction. The excess alkali was neutralized with hydrochloric acid and the mixtuer was diluted with methanol, filtered to remove precipitated sodium chloride, and the polymeric amine, poly(hydroxypropylenetetraethylenepentamine), obtained as a 30% by weight solution in aqueous methanol. The solution had an amine neutralization equivalent of 182.

To 21.5 g. of a solution in methanol containing 11.1 g. of the adduct diethylenetriamine+5 epichlorohydrin was added first 1.92 g. of 37-38% concentrated hydrochloric acid and then 4.3 g. of bishexamethylenetriamine. After dilution to 30 g. with methanol, the solution was heated for 1 hr. at 66°. The cooled viscous solution (52.3% of the initial titer) was treated with an additional 1.7 g. of hydrochloric acid to give the prepolymer (diethylenetriamine+5 epichlorohydrin hydrochloride: bis-hexamethylenetriamine::1:1 hydrochloride) as a 28% solution in aqueous methanol.

To this solution was added 0.36 g. of the poly(hydroxypropylenetetraethylenepentamine) solution described above and the mixture was heated to 70-72° and stirred 1 hr. The product was a 28.4% solution in aqueous methanol of the prepolymer (diethylenetriamine+5 epichlorohydrin hydrochloride:bis-hexamethylenetriamine:: 1:1 hydrochloride):poly(hydroxypropylenetetraethylenepentamine::5:1 (moles/equivalent)).

Paper from pulp treated with 1.5% of the prepolymer had improved wet (19% off-machine, and 26%, cured 1 hr. at 105° C.) and dry (108%, off-machine, and 127%, cured) tensile strengths compared to dry control paper from the same untreated pulp.

*Example 8*

This example illustrates the preparation of a threecomponent prepolymer from an adduct, an amino diamide, and a polymeric amine via a prepolymer derived from the first two components, an acid being added to retard gelation.

An adduct solution was prepared by allowing triethylenetetramine to react in methanol below 30° C. with 5 molar proportions of epichlorohydrin in a manner similar to that of Example 1. The solution contained 44.7% by weight of adduct or 0.735 mmole/g.

This cold solution (refrigerated until use), 27.2 g. (12.2 g. of adduct; 20 mmole) was treated with 6.0 g. of conc. hydrochloric acid (60 mmole HCl), stirred, and immediately treated with 8.1 g. (80 m. eq.) of an adipoyldiethylenetriamine prepared by heating a mixture of adipic acid and diethylenetriamine in xylene to 155-172° C. to distill off a water-xylene azeotrope, cooling and then aspirated to 175° C./20 mm. and finally to 1 mm. to remove xylene and diethylenetriamine. The mixture was heated and stirred at 65° for 1.5 hrs., cooled, and was then a very viscous amber solution (but containing no gel); titer, 54.7% of initial; 54.5% by weight of the prepolymer (triethylenetetramine+5 epichlorohydrin trihydrochloride:adipolydiethylenetriamine::1:4 (m./eq.)) in methanol. It was then completely soluble in water.

The above prepolymer solution, 20.6 g. (10 mmole of prepolymer), was treated with 1.3 g. (2.0 m. eq.) of 30% aqueous methanolic solution of the polymer amine described in Example 7. The resulting solution was heated to 65° and stirred for 30 min., when it was noted that it had become much more viscous and contained a trace of gel. Immediately an equal weight of water was added, with stirring and cooling, and then 1.0 g. (10 mmole) of hydrochloric acid, further to stabilize the solution, which then contained 26.8% by weight of the prepolymer, (triethylenetetramine+5 epichlorohydrintrihydrochloride:adipoyldiethylenetriamine::1:4 (m./eq.):polyhydroxypropylenetetraethylenepentamine)::5:1 (m./eq.), in aqueous methanol. It was then water-miscible, except for traces of gel.

*Example 9*

This example illustrates both the use of a hydrogenated diamine derived from tall oil and the effectiveness of modification of a simple prepolymer with an adduct based on triethylenetetramine followed by further modification with a polymeric amine.

A 104.5 g. portion of a commercial mixture of N-alkenyl-1,3-propanediamines, the alkenyl groups of which is specified as being derived from tall oil fatty acids ("Adogen 551," Archer-Daniels-Midland Co.) was hydrogenated at room temperature in 100 g. of ethanol over 1.0 g. of 5% rhodium on alumina catalyst, absorbing somewhat more than one mole of hydrogen per mole of diamine. After filtration to remove the catalyst, there remained a 46.5% by weight ethanol solution containing 1.325 mmole per g. as the hydrogenated tall oil diamine product.

To 100 g. (132.5 mmoles) of the hydrogenated tall oil diamine mixture prepared above there was added 100 ml. of methanol and then 34.4 g. of epichlorohydrin was added while cooling and stirring to maintain 20°–25° C. Analysis after 21.5 hours indicated 99.2% of theory degree of reaction for three moles of epichlorohydrin per mole of amine. The solution was refrigerated at once. It contained 34.4% by weight of the adduct and is defined as being a hydrogenated "Adogen 551" plus 2.8 epichlorohydrin adduct (0.564 mmole/g.).

To a 35.4 g. portion of the above adduct solution (20 mmoles) there was added 23.2 g. (30.8 mmoles) of the hydrogenated tall oil diamine, prepared as above, the mixture obtained was stirred, analyzed and then heated to 68° C. for 2 hours with stirring under reflux. The resulting prepolymer solution, 56.6 g., was cooled and upon analysis shown to have 72.4% of the initial titer. It contained 19 mmoles of simple prepolymer defined as: (hydrogenated tall oil diamine plus 2.8 epichlorohydrin:hydrogenated tall oil diamine::1:1.54).

To the 56.6 g. of above prepolymer solution, from which precipitated a finely divided solid at room temperature, there was added 25.8 g. of a methanol solution containing 19 mmoles of an adduct of triethylenetetramine plus 5 epichlorohydrin. After stirring the resulting prepolymer-adduct mixture and sampling for analysis the solution was heated three hours at 68° C. with stirring under reflux, cooled overnight, and found to have 81.2% of the initial titer. This viscous mixed alcoholic solution of prepolymer plus adduct, 41.3% by weight was easily dispersible in water to give a somewhat turbid pituitous aqueous solution of the prepolymer defined as (hydrogenated tall oil diamine plus 2.8 epichlorohydrin:hydrogenated tall oil diamine::1:1.54):triethylenetetramine plus 5 epichlorohydrin::1:1, which was termed Sample A.

To 40.7 g. of Sample A, above, there was added 1.8 g. of a 30% solution of a polymeric amine, a poly(hydroxypropylenetetraethylenepentamine) derived from tetraethylenepentamine plus 1.05 epichlorohydrin treated with sodium hydroxide, described in Example 7. After stirring and sampling, the solution was heated 2 hours at 68° C., cooled, and found to have 92% the initial titer. The amber solution, 41% in methanol was more viscous and gave a very pituitous aqueous slightly turbid solution. It contained the prepolymer [(hydrogenated tall oil diamine plus 2.8 epichlorohydrin:hydrogenated tall oil diamine::1:1.54):triethylenetetramine plus 5 epichlorohydrin::1:1]:polyhydroxypropylenetetraethylenepentamine::1.3:0.1 (mole/eq.) termed Sample B.

When applied according to the usual way ("wet end" method) to bleached Gatineau sulfite pulp slurry at the 1% rate, based on the weight of dry pulp fiber, and formed into paper handsheets on the Noble and Wood machine, and the "off-machine" sheets allowed to stand four days before testing, both Samples A and B gave more than 6000 seconds of sizing toward both ink and water. Furthermore, Sample A-treated sheets had 75% of the tensile strength of untreated control sheet which had 0 sec. sizing and Sample B-treated sheets had 88% of the tensile strength of the dry untreated control sheets. Although it was not practical to distinguish between the very hard sizing of the two samples A and B, the marked improvement in tensile strength data over comparable simple prepolymers of an adduct and an amine (ranging from 45–55%, dry tensile) demonstrates the practical advantages of the use of multi-component prepolymer compositions prepared by the use of several synthesis steps.

*Example 10*

This example describes a polymeric hydrophobic amine prepared from a hydrophobic diamine and approximately one molar equivalent of epichlorohydrin.

A commercial mixture of N-aliphatic-substituted 1,3-propanediamines in which the aliphatic groups were derived from tallow fatty acids ("Duomeen T" Armour Industrial Chem. Co.). 104 g. (0.300 mole), and 33 g. of 40% aqueous sodium hydroxide were stirred and heated to 75° C., then treated dropwise with 25 g. of epichlorohydrin (0.27 mole or 90% of equimolar amounts) during 30 minutes, during which period the temperature rose exothermically to 95–100°. Heating at 90–95° and stirring were continued for another 1.5 hours, then the slightly cooled mixture was partially neutralized with conc. hydrochloric acid, diluted with 200 ml. methanol and the neutralization completed, (to thymolphthalein indicator). The oily polymeric amine was insoluble in the upper aqueous methanol layer, which was decanted. The oil was dissolved in ether-hexane, washed with water, dried over magnesium sulfate, filtered, and freed of solvents of 90°/20 mm., leaving a very viscous light amber translucent oil (116.6 g.). It had a neutralization equivalent of 214. Analysis indicated that 39% of the total basic amino nitrogen was tertiary, the remaining 61% being primary and secondary amino nitrogens. Further, 91% of the initial amine basicity was retained, thus 9% was converted to quaternary ammonium salts during the reaction. It can be termed: poly(hydroxypropylene-N-tallow alkyl-1,3-propanediamine).

A similar product was prepared in this way from an exhaustively hydrogenated sample of the same commercial diamine, using 95% of an equimolar quantity of epichlorohydrin. In this case the N.E. was 195, and 43% of the basic amine nitrogen was tertiary by analysis.

*Example 11*

This example illustrates the preparation of an adduct from a copolymeric amine, and a prepolymer therefrom with more copolymeric amine.

A mixture of 31.8 g. of a copolymeric amine, prepared from hydrogenated N-alkyl-1,3-propanediamine and 0.95 mole of epichlorohydrin per mole of amine in the presence of sodium hydroxide, 100 ml. of methanol, and about 120 ml. of hexane, was treated with isopropanol until the solution cleared (total weight was 250.4 g.). This amine solution was treated with 14.8 g. of epichlorohydrin and stirred for 6 days at 20°–25° C. when analysis indicated 66% of the epichlorohydrin had reacted. Aspiration and distillation of the volatiles below 40° left as a viscous residual oil 40.5 g. of the adduct, a pick-up of 8.7 g. Thus, the adduct may be considered to contain 0.55 mole of epichlorohydrin per equivalent of copolymeric amine.

This and other similar adducts may be condensed with more of the copolymeric amines, with various polyamines, etc., to form prepolymers with any desired hydrophobic balance.

Thus, an equal number of equivalents of this adduct and the copolymeric amine from which it was prepared were condensed in methanol at ambient temperatures to give a prepolymer, which formed an oily lower layer and a methanolic solution. (When a sample of this prepolymer after two days was heated to 65° for 75 min., the lower oil became very viscous and, although heating was discontinued, it soon gelled to a rubbery mass, insoluble in acetic acid.)

*Example 12*

This example illustrates the synthesis of a prepolymer from a simple hydrophobic prepolymer and the former hydrophobic copolymeric amine of Example 11.

A prepolymer was prepared from the adduct of tetraethylenepentamine with 7 molar proportions of epichlorohydrin and a hydrogenated tallow alkyl-1,3-propanediamine in 1:2 mole ratio in ethanol-methanol solvents. After ambient pre-curing for 3 days, the prepolymer was heated 2 hours at 73°.

Then 20 g. of solution containing 11.2 g. of prepolymer was treated with 2.43 g. of methanolic solution containing 1.5 g. of the copolymeric amine, poly(hydroxypropylene-tallow-1,3-propanediamine) and the whole diluted to 40 g. with methanol. The mixture was shaken on the mechanical shaker six days and then a portion (20 g.) was heated 2 hrs. at 660. The ratio was 1:1 (moles:equivalents).

*Example 13*

This example illustrates the preparation of a multi-component prepolymer and its use as an internal paper size, wherein the incorporation of a dilute alkaline pretreatment step, prior to addition to the pulp slurry, is particularly advantageous to the rapid curing of water resistance and dry tensile strength of the paper.

An adduct solution, 36 g. containing 21.5 g. of the adduct (A) from hydrogenated N-tallow alkyl-1,3-propanediamine (B) with three mole equivalents of epichlorohydrin in ethanol, which had been "aged" until the neutralization equivalent was 165% of the theoretical value, was treated with 24.2 g. of the same hydrogenated diamine (B) as 92.5 g. of methanolic solution. The mixture was agitated 48 hrs. at room conditions. The final solution contained simple prepolymer in which the nominal mole ratio of adduct to amine may be abbreviated A:B::1:2 or 0.333 mmole/g.; 43.9% by weight.

This solution, 36.0 g., containing 15.8 g. of prepolymer, nominally 12 mmole, was mixed with 23.2 g. (15.1 g., 18 mmole) of a methanolic adduct (C) solution prepared from tetraethylenepentamine and seven molar proportions of epichlorohydrin in methanol, agitated 18 hours at room temperature, then heated at 60-63° for 1 hour and again agitated 24 hrs. at 20-25°. The prepolymer molar composition is: (A:B::1:2):C::1:1.5.

Finally, the product was modified with the polymeric amine (D) obtained from tetraethylenepentamine and 1.05 molar proportions of epichlorohydrin in the presence of excess aqueous sodium hydroxide. The prepolymer (10.3 g. or 4.0 mmole) in 19.7 g. of the above solution was combined with 4.0 mequiv. of polymeric amine as 0.8 g. of wet methanolic 30% solution by agitating 3 days at room temperature then heating 2 hrs. at 60-65°. The viscous prepolymer solution contained 51% solids by weight and is given by [(A:B::1:2):C::1:1.5]:D::1:1, the latter ratio giving moles of the bracketed composition per mequiv. (milliequivalent) of polymeric amine.

When this prepolymer solution was diluted with water and applied at the 1% rate (solids to dry pulp) to bleached Gatineau sulfite pulp and the final pH adjusted to 9 prior to sheet formation, the resulting paper after aging one day off-machine had only 24 sec. of standard water resistance, 2150 sec. of ink resistance, and 90% dry tensile strength. An untreated but otherwise identically prepared control sheet had 0 sec. water and ink resistance and 100° dry tensile.

However, when 10 g. of prepolymer solution was agitated with 1700 ml. water, and 100 ml. of this solution adjusted with alkali to pH 11.0 and allowed to stand 20 min. at room temperature, then applied at the 1% rate to the same pulp slurry and again adjusted to pH 9, the resulting sheet after one day off-machine had 1750 sec. water resistance, 2950 sec. ink resistance, and 104% of control dry tensile. This sheet after 4 days off-machine had more than 6000 sec. of water resistance while the previous sheet had only 145 sec. Similar results were obtained by alkali activation steps at pH 10-11.5 for 5-60 min. and at final pH's of 7 or 9 with this product.

*Example 14*

A four component prepolymer composition is prepared by mixing a copolymeric amine of type IV, prepared as described in Example 10, with a three component prepolymer composition, prepared as described in Example 3.

Thus, a prepolymer, prepared by adding diethylenetriamine to an adduct of diethylenetriamine and 5 epichlorohydrins (first components) was treated with a mixture of N-alkyl-1,3-propanediamine, in which $C_{18}$ alkyl (second component) predominates, and then with an adduct of a mixture of hydrogenated tallow N-alkenyl-1,3-propanediamine and an average of 2.8 epichlorohydrins per molecule (third component). To this prepolymer composition there is added 1 milliequivalent of a poly(hydroxypropyleneethylenediamine) per mole of prepolymer. The poly(hydroxypropyleneethylenediamine) polymeric amine (fourth component) was prepared by reacting diethylenetriamine with an equimolar amount of epichlorohydrin in methanol as a solvent, in the presence of a molar excess of aqueous sodium hydroxide. After complete reaction the excess sodium hydroxide was neutralized with hydrochloric acid, and the aqueous-methanol layer containing the by-product sodium chloride was removed.

These prepolymer compositions are especially suited for application to cellulosic pulp used to make paper for increasing the tensile strength of said paper.

*Example 15*

To one molar equivalent of a prepolymer composition prepared as described in Example 5, there is added one equivalent of a polymeric amine, prepared by reacting in methanol equimolar amounts of triethylenetetramine and epichlorohydrin in the presence of a molar excess of aqueous sodium hydroxide as described in Example 10.

USES

The prepolymer compositions so obtained having hydrophobic groups are particularly valuable as polysaccharide modifying agents such as water-proofing agents or sizing agents for starch and cellulose-based products. The prepolymer compositions are especially suitable in paper sizing applications and have particular advantages when used for such purposes in comparison with other sizing agents. These prepolymer compositions not only show greatly improved activity at standard concentrations, but in addition, these prepolymer compositions give sizing action which is simply related to the amount or percentage of applied prepolymer, based on the dry weight of the treated paper. Also these prepolymer compositions are excellent sizing agents in that they are relatively insensitive to pH, i.e., they are active over a wide pH range. They have shown sizing action when applied to aqueous paper pulp suspensions at pH's ranging from 5 to 13. Also, these prepolymer materials are relatively insensitive to the alum used in paper making processes. These prepolymers have given good sizing action to papers containing up to 3% alum. An important advantage in paper-sizing applications is that papers treated with these prepolymer materials retain 97-99% of the brightness of the untreated paper, whereas many other sizing agents have severe limitations in use because of the loss in brightness of the sized paper as compared with untreated paper. It is within the scope of this invention to add the prepolymer (a) and any reactant (b), (c), (d), etc. in the above defined proportions, separately to the paper pulp, and then admix them in such medium. It is preferred, however, to prepare the multi-component prepolymer in solution as indicated above, and then use such prepolymer solution for paper sizing applications or for water-proofing application on starch or cellulose-based products. These prepolymers are useful for sizing and water-proofing raw natural cellulosic material such as cotton and various textile materials including cellulose-containing filaments, fibers, yarns, and fabrics. The sizing action of these materials is permanent and is not removed from the cellulose by washing. This is believed to be due to the fact that in the presence of the polysaccharide substrate such as starch or cellulose, these prepolymer materials containing the active functional haloalkanol groups and amino hydrogens react to form insoluble, cross-linked polymers in the matrix of the polysaccharide, substrate.

Other substrates which may be treated with the prepolymer compositions of this invention are, natural and synthetic fibers and fabrics such as wool, polyamide, polyimide, polyester materials as well as inorganic fibers and fabrics such as glass, etc.

Cellulosic paper products of various types may be treated with the ingredients of the compositions of this invention according to techniques known to those skilled in the art. For example, the multi-component prepolymer compositions or the ingredients thereof may be applied to finished paper stock directly, in solution, as an emulsion, or otherwise dispersed form. However, for best results, it is preferred to add to the aqueous cellulosic paper pulp stock which is to be used in making said paper, the prepolymer reaction product of the prepolymer reactant (a) and the reactant (b), (c), (d), etc. in solution in amounts sufficient to give the desired characteristics e.g., from 0.2 to 3% (although, concentrations by weight ranging from 0.01 to 5% based on the weight of the dry pulp can be used) before the pulp is formed into paper sheets, boards, etc.

A variety of pulps may be treated with the prepolymer compositions, or the ingredients, described above, and used to make the permanently sized paper according to this invention including bleached and unbleached sulfite pulp, bleached and unbleached pulps obtained from grasses such as bamboo, bagasse, etc., bleached and unbleached kraft pulp, soda pulp, hardwood pulp, and mixtures of groundwood pulp with unbleached kraft pulp and other pulp.

The water-proofing of textile materials is accomplished according to this invention by impregnating the cellulosic textile material comprising cellulose filaments, fibers, fabrics, etc. with a solution of the prepolymer composition usually in water at pH 6–11 and then drying and thereafter subjecting the treated material to mildly elevated temperatures to produce a substantially water insoluble finish on the cellulosic textile. The textile material may be impregnated with the prepolymer compositions in solution of from 0.1% to 5% by weight of the prepolymer. The total amount of the prepolymer impregnated into the textile materials is usually at least 0.3% by weight.

The compositions may be applied to the textile materials in various ways so long as impregnation of the textile materials is obtained. For example, the textile materials may be dipped or immersed in the composition or the composition may be dripped or sprayed on the textile materials until the textile material is wetted out with the composition. In order to facilitate the control of the application of the prepolymer of this invention on the textile materials and reduce the drying time, it is desirable to extract the textile material to remove excess solution therefrom. This is suitably accomplished by padding, wringing, squeezing, or hydro-extracting the textile material. The amount of the prepolymer applied to the textile material is controlled by the degree of extraction used/or the concentration of these materials in the solution, and may be varied widely, depending upon the amount of water-repellency desired in the textile material. In general, the amount of such ingredients applied is between 0.1 and 5% by weight, based on the dry textile material, but good practical water-repellent effects are obtained on most textiles by applying from about 0.2 to 2% by weight, based on the dry textile material.

After the compounds have been applied, in solution, the textile material may then be dried at normal drying temperatures and finally heated to elevated temperatures of about 150 to 300° F. to obtain a water-repellent finish on the textile material. The temperature may be higher than 300° F. depending upon the particular textile material, the type and amount of catalyst, and the duration of heating is limited only by the stability of the textile material. The duration of heating may vary widely depending primarily upon the liquid content and the temperature used that is generally between about 1 and 15 minutes with the longer time corresponding to the lower temperatures. The textile material thus obtained may be given the usual finishing operations such as a refinish wash to remove water-soluble materials, steam framing, and the like. Such operations may be desirable but are not essential. After the textile material has been dried of excess solution the compounds may be allowed to cure at room temperature with no added heating step required.

A large variety of textile materials comprising cellulose fibers may be treated in accordance with the processes of this invention. The textile materials treated may be woven or knitted fabrics, referred to generally as fabrics or yarns, filaments, or fibers but it is preferred to treat fabrics. The cellulose fibers may be natural cellulose fibers such as cotton, linen, flax, or ramie fibers, or regenerated cellulose staple fibers or filaments produced by the viscose or cuprammonium processes. It is preferred, however, to treat cotton fibers or viscose rayon staple fibers or filaments. The preferred textile materials are 100% cotton woven fabrics or 100% viscose rayon woven fabrics or woven fabrics composed entirely of cotton and viscose rayon. However, non-cellulosic fibers such as wool, glass, synthetic fibers, and the like may also be treated.

The multi-component prepolymers described above can be incorporated into textile substrates in the form of organic solutions or aqueous solutions or suspensions which are prepared according to techniques known in the art. These solutions may contain one or more of various types of cationic, anionic, or non-ionic wetting agents which are known in the art. The solutions of the above compounds may also contain other paper making or textile ancillaries such as stiffening or bodying agents, softening agents, curing agents, and high foaming agents, and the like but such agents are not essential.

As examples of stiffening or bodying agents which may be employed may be mentioned aqueous dispersions of water-insoluble thermoplastic vinyl resins such as polyvinyl acetate, polyvinyl chloride, polystyrene, polyalkylene acrylates, polyalkyl methacrylates, vinyl chloride, vinyl acetate copolymers and the like and/or water soluble thermoplastic resins such as polyvinyl alcohols; water-soluble partially hydrolyzed polyvinyl acetates, water soluble salts of styrene-maleic anhydride copolymers, styrene-alkyl acid maleate copolymers, vinyl acetate-maleic anhydride copolymers, vinyl acetate-crotonic acid copolymers, vinyl acetate-alkyl acid maleate copolymers; or the like. Generally, such agents are employed in amount of about 0.05 to 5% by weight of the composition.

As examples of wetting agents which may be used may be mentioned sodium salts of alkylated benzene sulfonates such as sodium decyl benzene sulfonate, sodium dodecylbenzene sulfonate, sodium lauryl sulfate, the sodium salt of methyl stearamide ethionic acid, dioctyl sodium sulfosuccinate, and the like. In general, such agents are employed in amount of about 0.05 to 3%.

As examples of anti-foaming agents which may be used if desired may be mentioned water-insoluble silicone compounds, water insoluble oils, water-insoluble alcohols and the like. The amount of such agent used varies with its effectiveness in minimizing foaming, but in general, amounts of about 0.1% to 5% by weight of the compositions may be employed.

I claim:

1. A water-soluble prepolymer composition comprising the reaction product of from two to four components wherein one component (a) is a prepolymer and at least one of the other components is selected from the group consisting of (b) aliphatic amines (c) an adduct of an epihalohydrin and an aliphatic amine, and mixtures of aliphatic amines, and (d) prepolymers, all of said components being further defined as follows:

(a) is a prepolymer obtained by reacting
(1) an adduct of an epihalohydrin and aliphatic amine having at least one primary amino nitrogen and at least two amino hydrogens, said adduct having from two to ten haloalkanol equivalents per mole of amine, said aliphatic amine, having a formula selected from the group consisting of (I) 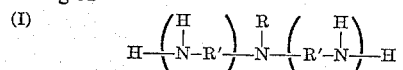

(II) 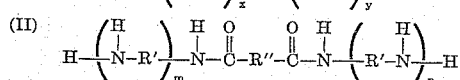

(III) 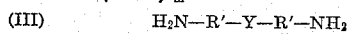

and (IV) 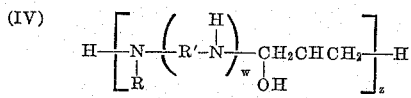

wherein R is selected from the group consisting of hydrogen, alkyl groups having from 1 to about 24 carbon atoms, alkenyl groups having from 3 to about 24 carbon atoms with the double bond thereof at least two carbon atoms removed from a nitrogen-carbon bond, and acyl radicals of the type $R'''C(O)—$ wherein $R'''$ is an alkyl group having from 1 to about 24 carbon atoms, $R'$ is a bivalent alkylene group having from 2 to 6 carbon atoms, $R''$ is a bivalent group selected from the class consisting of alkylene and alkenylene groups having from 2 to 40 carbon atoms, each of $x$ and $y$ is an average number of from 0 to 6, $x$ plus $y$ equals 0 to 10, each of $m$ and $n$ is an average number of at least 1 and $m$ plus $n$ equals from 2 to 6, Y is a bivalent oxygen ether group selected from the class consisting of $—O—$, $—O—R'—O—$, and $—O(R'—O)_uR'—O—$ wherein $R'$ is as defined above, and $u$ is an average number of from 1 to about 100, $w$ is an average number of from 0 to 4, and $z$ is an average number of from 2 to 20, and mixtures of said types of amines, prepared by reacting said aliphatic amine with the epihalohydrin at least equivalent to the number of amino hydrogens in said aliphatic amine, in the presence of a non-aqueous liquid diluent containing at least a trace amount of an hydroxyl-containing material, at a temperature of from about 0° C. to about 50° C., with (2) an aliphatic amine of the types described above under (a)(1);

(b) is an aliphatic amine of the type described above under (a)(1);

(c) is an adduct of the type described above under (a)(1);

(d) is a prepolymer of the types described above under (a);

at least one of said components of said prepolymer composition having at least three moieties per molecule selected from the group consisting of haloalkanol equivalent derived from the epihalohydrin used and amino hydrogen, the molar proportion of said components in said prepolymer composition providing at least about 3 haloalkanol equivalents and 3 amino hydrogens for each combined total of from 6 to 14 haloalkanol and amino hydrogen equivalents, said prepolymer composition being characterized in that when a water solution of 5% or more by weight of prepolymer composition solids is treated with an alkali sufficient to raise the pH of the mixture to pH 11 to 13, the prepolymer composition will crosslink.

2. A prepolymer composition as described in claim 1 wherein the prepolymer component (a) is prepared from an adduct (1) of an epichlorohydrin and an amine of Formula I having at least 3 amino hydrogens, the amine (2) of the prepolymer component (a) is an amine of Formula I, another component (b) is an adduct of epichlorohydrin and an amine of the Formula I and a third component (c) is an amine of Formula IV.

3. A prepolymer composition as described in claim 1 in which component (a) is a prepolymer of the adduct N-alkyl-N,N',N'-tris(3-chloro - 2 - hydroxypropyl)-1,3-propanediamine wherein the alkyl is predominantly octadecyl, the amine of the prepolymer is N-alkyl-1,3-propanediamine wherein the alkyl is predominantly octadecyl, component (b) is an adduct of diethylenetriamine with 5 moles of epichlorohydrin and component (c) is a poly(hydroxypropylenetetraethylenepentamine).

4. A prepolymer composition as described in claim 1 wherein one component (a) is a prepolymer of an adduct of at least 3 epichlorohydrins and an amine of Formula I having at least 3 amino hydrogens and an amine of Formula I, a second component (b) is a mixture of amines of Formula I, a third component (c) is an adduct of an amine of Formula I and more than two epihalohydrins per molecule, and a fourth component (d) is an amine of Formula IV.

5. A prepolymer composition as described in claim 4 in which component (a) is a prepolymer from an adduct of diethylenetriamine and an average of at least 4 epichlorohydrins per molecule, and diethylenetriamine, the second component (b) is a mixture of N-alkyl- and N-alkenyl-1,3-propanediamines having an average of from 14 to 18 carbon atoms in the alkyl and alkenyl groups, the third component (c) is an adduct of a mixture of n-alkyl and N-alkenyl-1,3-propanediamines having an average of from 14 to 18 carbon atoms in the alkyl and alkenyl groups and epichlorohydrin, said adduct having at least 2 epichlorohydrin per molecule and the fourth component (d) is a poly(hydroxypropylenediethylenetriamine).

6. A prepolymer composition as described in claim 1 one component (a) of which is a prepolymer from an adduct of an amine of Formula I and an average of at least two epichlorohydrins per molecule and an amine of Formula I, a second component (b) of which is a prepolymer of an amine of Formula I and an average of at least 4 epichlorohydrins per molecule, and an amine of Formula I having at least 5 amino hydrogens and a third component (c) is an amine of Formula IV.

7. A prepolymer composition as described in claim 6 wherein component (a) is a prepolymer of an adduct of a mixture of N-alkyl- and N-alkenyl-1,3-propanediamine groups having an average of from 14 to 18 carbon atoms in the alkyl and alkenyl groups and epichlorohydrin, said adduct having an average of more than two epichlorohydrins per molecule, and a mixture of N-alkyl- and N-alkenyl-1,3-propanediamines having an average of from 14 to 18 carbon atoms in the alkyl and alkenyl groups, the second component (b) is a prepolymer of an adduct of diethylenetriamine and more than 4 epichlorohydrins per molecule and diethylenetriamine and component (c) is a poly(hydroxypropylenetriethylenetetramine).

8. A prepolymer composition as described in claim 1 wherein one component (a) is a prepolymer of an adduct of an amine of Formula I and an average of more than two epichlorohydrins per molecule, and an amine of Formula I, and a second component (b) is an amine of Formula III.

9. A prepolymer composition as described in claim 8 wherein component (a) is a prepolymer of an adduct of a mixture of N-alkyl- and N-alkenyl-1,3-propanediamines having an average of from 14 to 18 carbon atoms in the alkyl and alkenyl groups and an average of over two epichlorohydrins per molecule and a mixture of N-alkyl- and N-alkenyl-1,3-propanediamines having an average of from 14 to 18 carbon atoms in the alkyl and alkenyl groups, and a second component (b) is a polyethylene ether diamine having a molecular weight of from about 1000 to 3000.

10. A prepolymer composition as described in claim 1 wherein one component (a) is a prepolymer of (1) an adduct of an epihalohydrin and an aliphatic amine of Formula I, and (2) an aliphatic amine of Formula I, and another component (b) is a copolymeric aliphatic amine of Formula IV.

11. A prepolymer composition as described in claim 10 wherein component (a) is a prepolymer from (1) an adduct epichlorohydrin and tetraethylenepentamine, said adduct having an average of over 6.5 moles of epichlorohydrin per mole of amine, and (2) a N-alkyl-1,3-propanediamine wherein the carbon content of the alkyl group is derived from tallow and is hydrogenated to substantially complete saturation, and a second component (b) is a copolymeric aliphatic amine of an N-alkyl-1,3-propanediamine and epichlorohydrin reacted in substantially equimolar ratios in the presence of an alkaline material.

12. A prepolymer composition as described in claim 1 dissolved in a lower alkanol having from 1 to 6 carbon atoms.

13. A prepolymer composition as described in claim 1 dissolved in methanol.

14. A prepolymer of (1) an adduct of an epihalohydrin and a copolymeric amine of the formula

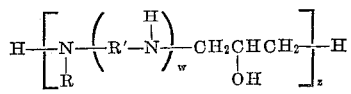

wherein R is selected from the group consisting of alkyl groups having from 10 to about 24 carbon atoms, alkenyl groups having from 3 to about 24 carbon atoms with the double bond thereof at least two carbon atoms removed from a nitrogen carbon bond, and acyl radicals of the type R'''C(O)— wherein R'' is an alkyl group having from 10 to 24 carbon atoms, R' is a bivalent alkylene group having from 2 to 6 carbon atoms, w is an average number of from 0 to 4 and z is an average number of from 2 to 20, said adduct having at least 0.5 moles of epihalohydrin per equivalent of copolymeric aliphatic amine, and (2) a copolymeric aliphatic amine of the type described in (1).

References Cited by the Examiner
UNITED STATES PATENTS

| | | | |
|---|---|---|---|
| 2,365,825 | 12/1944 | Kyrides | 260—584 |
| 2,469,683 | 9/1945 | Dudley et al. | 260—2 |
| 2,848,426 | 8/1958 | Newey | 260—2 |
| 2,884,459 | 4/1959 | Kirkpatrick et al. | 260—84 |
| 2,921,037 | 1/1960 | Andres et al. | 260—2 |
| 2,932,603 | 4/1960 | Sterling | 162—164 |
| 2,955,067 | 10/1960 | McBurney et al. | 162—164 |
| 3,031,504 | 4/1962 | Pollitzer | 260—2 |
| 3,031,505 | 4/1962 | Pollitzer | 260—2 |
| 3,108,011 | 10/1963 | Frotscher | 260—2 |

WILLIAM H. SHORT, *Primary Examiner.*

T. D. KERWIN, S. N. RICE, *Assistant Examiners.*